(12) United States Patent
Horn et al.

(10) Patent No.: US 7,653,646 B2
(45) Date of Patent: Jan. 26, 2010

(54) METHOD AND APPARATUS FOR QUANTUM CLUSTERING

(75) Inventors: David Horn, Tel Aviv (IL); Assaf Gottlieb, Hod HaSharon (IL); Inon Axel, Ramat Gan (IL)

(73) Assignee: Ramot At Tel Aviv University Ltd., Tel-Aviv (IL)

( * ) Notice: Subject to any disclaimer, the term of this patent is extended or adjusted under 35 U.S.C. 154(b) by 1386 days.

(21) Appl. No.: 10/474,508

(22) PCT Filed: May 14, 2002

(86) PCT No.: PCT/IL02/00374

§ 371 (c)(1),
(2), (4) Date: Oct. 22, 2003

(87) PCT Pub. No.: WO02/093810

PCT Pub. Date: Nov. 21, 2002

(65) Prior Publication Data

US 2004/0117403 A1 Jun. 17, 2004

Related U.S. Application Data

(60) Provisional application No. 60/290,385, filed on May 14, 2001.

(51) Int. Cl.
*G06F 17/30* (2006.01)
(52) U.S. Cl. .......................................... 707/102; 707/6
(58) Field of Classification Search .................. 707/1–8, 707/100, 101, 102; 324/306; 708/400; 709/201; 712/14; 382/260
See application file for complete search history.

(56) References Cited

U.S. PATENT DOCUMENTS

| 5,263,120 | A | 11/1993 | Bickel |
| 6,021,383 | A | 2/2000 | Domany et al. |
| 6,078,701 | A * | 6/2000 | Hsu et al. .................. 382/294 |
| 6,134,537 | A | 10/2000 | Pao et al. |
| 6,212,509 | B1 | 4/2001 | Pao et al. |
| 6,345,235 | B1 * | 2/2002 | Edgecombe et al. .......... 702/27 |
| 7,092,928 | B1 * | 8/2006 | Elad et al. .................. 706/60 |
| 2002/0128997 | A1 * | 9/2002 | Kil et al. .................. 707/1 |
| 2002/0138492 | A1 * | 9/2002 | Kil .......................... 707/100 |
| 2007/0055662 | A1 * | 3/2007 | Edelman et al. ............ 707/6 |
| 2007/0129928 | A1 * | 6/2007 | Lin et al. .................. 703/17 |
| 2007/0130219 | A1 * | 6/2007 | Lin et al. .................. 707/202 |

OTHER PUBLICATIONS

Blatt et al. "Superparamagnetic Clustering of Data", Physical Reviews Letters, 76(18): 3251-3254, 1996.
Duda et al. "Pattern Classification: Contents", A Wiley-Interscience Publication, 2nd Ed.: 12 P., 2001.
Golub et al. "Molecular Classification of Cancer: Class Discovery and Class Prediction by Gene Expression Monitoring", Science, 286: 531-537, 1999.

(Continued)

*Primary Examiner*—Diane Mizrahi

(57) ABSTRACT

A method of determining clusters of data within a dataset, the dataset is represented by a plurality of multidimensional data entries, the method comprises (a) spanning a space, represented by a plurality of points; (b) determining a density function over the space;(c) associating a potential to the density function; (d) locating a plurality of local minima of the potential; and (e) for each of the plurality of local minima, attributing at least one of the points; thereby determining clusters of data within the dataset.

53 Claims, 19 Drawing Sheets

OTHER PUBLICATIONS

Roberts "Parametric and Non-Parametric Unsupervised Cluster Analysis", Pattern Recognition, 30(2): 261-272, 1997.
Scherf et al. "A Gene Expression Database for the Molecular Pharmacology of Cancer", Nature Genetics, 24(3): 227-234, 2000.
Press et al. "Numerical Recipes in C. The Art of Scientific Computing", Cambridge University Press, 2nd Ed., 8 P., 1992.
Blake et al. "UCI Machine Learning Repository Content Summary", UCI ML Databases, 19 P., 1998.
Fisher "The Use of Multiple Measurements in Taxonomic Problems", Annals of Eugenics, 7: 179-188, 1936.
Ripley "Pattern Recognition and Neural Networks : Contents", Cambridge University Press, 3 P., 1996.
Roberts et al. "Maximum Certainty Data Partitioning", Pattern Recognition, 33: 833-839, 2000.
Spellman "Comprehensive Identification of Cell Cycle-Regulated Genes of the Yeast *Saccharomyces cerevisiae* by Microarray Hybridization D", Molecular Biology of the Cell, 9: 3273-3297, 1998.

* cited by examiner

METHOD AND APPARATUS FOR QUANTUM CLUSTERING

RELATED PATENT APPLICATION

This application is a National Phase Application of PCT/IL02/00374 International Filing Date 14 May 2002, which claims priority from U.S. Provisional Patent Application No. 60/290,385 filed 14 May 2001.

FIELD AND BACKGROUND OF THE INVENTION

The present invention relates to a method and apparatus for clustering multidimensional data and, more particularly, to a method and apparatus for clustering multidimensional data incorporating quantum mechanical techniques.

There is a growing emphasis on exploratory analysis of large datasets to discover useful patterns. Organizations are investing heavily in "data warehousing" to collect data in a form suitable for extensive analysis, and there has been extensive research on clustering.

Informatics is the study and application of computer and statistical techniques for the management of information.

Bioinformatics includes the development of methods to search biological databases fast and efficiently, to analyze the information, and to predict structures which appear to exist within the data. Increasingly, molecular biology is shifting from the laboratory bench to the computer desktop. Advanced quantitative analyses and computational algorithms are needed to explore the relationships between data entries, thereby to recognize and classify fully or partially the database.

Numerous databases in general and biological databases in particular include large sequences of data, which need to be recognized, classified, and/or grouped into families. In the past, information could only be of assistance for human experts who would thoroughly research the output of database searching programs and would create a grouping according to families. Certainly, this method is time-consuming, labor-intensive and not very reproducible. Nevertheless, the diversity of different families often varies and families are not always exactly defined, hence the task of automated data grouping is not at all trivial.

Given a very large set of multi-dimensional data points, the data space is usually not uniformly occupied by the data points. Instead, some regions in the space are sparse while others are crowded. A clustering method identifies the sparse and the crowded regions, and discovers the overall distribution patterns of the dataset. Therefore, by using clustering methods, a better understanding can be obtained of the distribution patterns of the dataset and the relationship patterns among data attributes to improve data organizing and retrieving. It is also possible to visualize the derived clusters much more efficiently and effectively than the original dataset. Indeed, when the dataset is very large and the dimensions are higher than two, visualizing the whole dataset in full dimensions is almost impossible.

Numerical taxonomy relates to classification methods using numerical characteristics of individuals and populations. Over the years, numerical taxonomy methods have been developed using abstract objects which are not tied to any particular context, but rather can be applied to various data types. Known prior art clustering methods, that divide the data according to natural classes present in it, have been used in a large variety of scientific disciplines and engineering applications that include pattern recognition, learning theory, astrophysics, medical image and data processing, image compression, satellite data analysis, automatic target recognition, speech and text recognition, classification of diseases in medicine, grouping of chemical compounds, such as nucleic acids and proteins, classification of statistical findings for social studies and other types of data analysis.

Many clustering methods are known in the art. The methods are based on a variety of mathematical and/or physical principles. In graph theory methods, each data entry in the database is represented as a vertex on a graph, and similarity measures between data entries are represented as weighted edges between vertices. Clusters are formed by iterative deletions of edges, and by constructing a minimal spanning tree of the graph.

In density estimation methods, the entire database is represented as points in a space which is defined by the characteristics of the data entries. If the data is not completely random, different regions in the data space have different density of points. Clusters of data are viewed as high density regions separated by low-density regions. An example of a density estimation method is the so called scale-space clustering disclosed in an article authored by Roberts S. J., entitled "Parametric and non-parametric unsupervised cluster analysis", and published in Pattern Recognition, 30(2):261-272 (1997). In this method, the probability density function is estimated using a set of Gaussian kernels sited at each data point. The clusters are located near maxima of the density function or near zero-crossing of its spatial derivative.

Another clustering method employs the laws of physics in order to identify clusters in a database. An example is disclosed by Blat et al. in U.S. Pat. No. 6,021,383. According to Blat et al., data points are associated with physical quantities called Potts-spins. Ferromagnetic interactions are introduced between each pair of neighboring spins and the strength of these interactions decreases with increasing distance or dissimilarity between points.

The two main clustering approaches are called hierarchical and partitional. In hierarchical methods, the data are organized in a "nested" sequence of groups. Hierarchical clustering is a procedure which iteratively adjusts the number of clusters by either merging small clusters or splitting large clusters of data points. Different hierarchical methods employ different decision rules for merging or splitting clusters. The end result of a hierarchical method is a tree of clusters called a dendrogram, which shows the relation between the final clusters. Before completing the analysis, a decision has to be made about an optimal position to cut the dendrogram in order to retrieve the number of clusters existing in the data.

Hierarchical methods have been successfully applied to many biological problems, e.g., for producing taxonomies of animals and plants. However, hierarchical methods have a rather large complexity which grows as a cubic power of the total number of objects which are clustered. Moreover, hierarchical methods are not suitable to all kinds of databases, as the basic feature of any hierarchical method is to impose a hierarchy on the data, while such property of the data may not exist at all. An additional drawback of hierarchical methods is that once two objects are merged, these objects always belong to one cluster, and once two objects are separated, these objects are never re-grouped into the same cluster. Thus, in hierarchical methods motion within the data space is limited. Still another drawback of hierarchical methods is a tendency to cluster together individuals linked by a series of intermediates. This property, generally known as chaining, often gives poor results in cases where noisy data points are present.

Unlike hierarchical methods, partitional clustering methods attempt to directly decompose the data set into a set of disjoint clusters. These methods minimize some local or global criterion function that may emphasize the structure of the data. Very often, clusters which are found by a partitioning method are more similar than the clusters which are found by a hierarchical method, hence partitional clustering provides more qualitative results. Most of the partitional methods rely, implicitly or explicitly, upon some assumptions. However, like in hierarchical methods, data may not conform to these assumptions and an incorrect structure of the data may be obtained. Another difficulty, also encountered in hierarchical method, is the necessity to estimate an optimal number of clusters, before completing the analysis.

An example of a partitional method is the so called K-means algorithm. By a successive sequence of iterations, the K-means algorithm aims to minimize some criterion, which is typically the sum of the squares of the distances from all the data points in the cluster to their nearest cluster centers. The main advantage of the K-means algorithm is the low complexity which is achieved once the number of clusters is determined. However, when clustering data using the K-means algorithm, the number of clusters must be determined a-priori, and sometimes affects the quality of the results. The K-means algorithm intrinsically assumes spherical shape of all the clusters, which of course may not be correct. Like many other iterative procedures, not necessarily related to clustering methods, the K-means algorithm may be locked in some local minima and may not converge to the desired global minimum. Although several procedures have been employed to try and overcome the local minima problem, so far none guarantees finding the global minimum.

Hence, all the known clustering methods detailed above, suffer from one or more limitations which may commonly be attributed to assumptions and decisions which are made in advance; a predetermined structure of the data even though it may be erroneous; and a predetermined number of clusters, which may affect the quality of the results.

The present invention provides solutions to the problems associated with prior art clustering techniques.

SUMMARY OF THE INVENTION

According to one aspect of the present invention there is provided a method of determining clusters of data within a dataset, the dataset is represented by a plurality of multidimensional data entries, the method comprising: (a) spanning a space, represented by a plurality of points; (b) determining a density function over the space; (c) associating a potential to the density function; (d) locating a plurality of local minima of the potential; and (e) for each of the plurality of local minima, attributing at least one of the points; thereby determining clusters of data within the dataset.

According to another aspect of the present invention there is provided a method of determining clusters of biological data within a dataset, the dataset is represented by a multidimensional dataset-matrix, M, the method comprising: truncating the dataset-matrix, M, so as to construct a truncated space having a reduced dimensionality, the truncated space is represented by a plurality of points, each representing one biological entry; and partitioning the plurality of points, into a plurality of clusters; thereby determining clusters of biological data within the dataset.

According to further features in preferred embodiments of the invention described below, the spanning of the space is by defining, for each of the plurality of points, a multidimensional coordinate respectfully representing one multidimensional data entry.

According to still further features in the described preferred embodiments the method further comprising iteratively merging each cluster into a single point increasing the width and repeating the steps (a) to (e), thereby defining a dendrogram of clusters.

According to still further features in the described preferred embodiments spanning a space is by eliminating at least one dimension from the dataset.

According to still further features in the described preferred embodiments eliminating is by constructing a correlation matrix from the dataset, calculating a set of eigenvalues of the correlation matrix, and selecting a subset of the set of eigenvalues.

According to still further features in the described preferred embodiments the subset includes the largest eigenvalues of the set of eigenvalues.

According to still further features in the described preferred embodiments the method further comprising: (f) merging each cluster into a single point; (g) increasing the width; and (h) repeating the steps (b) to (e).

According to still further features in the described preferred embodiments the method further comprising iteratively repeating the steps (g) to (h), thereby defining a dendrogram of clusters.

According to yet another aspect of the present invention there is provided an apparatus for determining clusters of data within a dataset, the dataset is represented by a plurality of multidimensional data entries, the apparatus comprising: a space spanning unit for spanning a space, represented by a plurality of points; a density function determinator for determining a density function over the space; a potential associator for associating a potential to the density function; a locator for locating a plurality of local minima of the potential; and a cluster builder for attributing, for each of the plurality of local minima, at least one of the points.

According to still another aspect of the present invention there is provided an apparatus for determining clusters of biological data within a dataset, the dataset is represented by a multidimensional dataset-matrix, M, the apparatus comprising: a matrix truncating unit for truncating the dataset-matrix, M, so as to construct a truncated space having a reduced dimensionality, the truncated space is represented by a plurality of points, each representing one biological entry; and a partitioning unit for partitioning the plurality of points, into a plurality of clusters.

According to still further features in the described preferred embodiments each one of the plurality of points has a multidimensional coordinate respectfully representing one multidimensional data entry.

According to still further features in the described preferred embodiments the correlation matrix is an autocorrelation matrix.

According to still further features in the described preferred embodiments the correlation matrix is a covariance matrix.

According to still further features in the described preferred embodiments the dataset has a matrix form, hence the dataset is a dataset-matrix, M.

According to still further features in the described preferred embodiments the space spanning unit includes a matrix truncating unit for truncating the dataset-matrix, so as to construct a truncated space having a reduced dimensionality.

According to still further features in the described preferred embodiments truncating is by constructing a transformation matrix from the dataset-matrix, calculating a set of eigenvalues of the transformation matrix, and selecting a subset of the set of eigenvalues, thereby constructing the truncated space.

According to still further features in the described preferred embodiments the subset includes largest eigenvalues of the set of eigenvalues.

According to still further features in the described preferred embodiments constructing the transformation matrix is by multiplying the dataset-matrix by a first matrix from the left and by a second matrix from the right, each of the first and second matrices being respectively formed from an orthonormal set of vectors.

According to still further features in the described preferred embodiments the method further comprising projection of each point in the truncated space onto a unit sphere in the truncated space.

According to still further features in the described preferred embodiments, the partitioning comprising: (a) determining a density function over the truncated space; (b) associating a potential to the density function; (c) locating a plurality of local minima of the potential; and (d) for each of the plurality of local minima, attributing at least one of the points; thereby partitioning the plurality of points, into a plurality of clusters.

According to still further features in the described preferred embodiments determining the density function is by assigning a set of kernels, one for each of the plurality of points and summing over the set of kernels.

According to still further features in the described preferred embodiments associating the potential is by constructing a physical analog quantum mechanical model over the truncated space, the model having a Hamiltonian which includes the potential.

According to still further features in the described preferred embodiments associating the potential is by determining an operator in a manner such that the density function is an eigenfunction of the operator with an eigenvalue, E, the operator includes the potential.

According to still further features in the described preferred embodiments the eigenvalue, E, is selected so that a minimal value of the potential is substantially zero.

According to still further features in the described preferred embodiments locating the plurality of local minima of the potential is by evaluating the potential in a plurality of evaluation points, thereby providing a plurality of potential values, and selecting at least one local minimal value of the potential values.

According to still further features in the described preferred embodiments attributing the points is by visual means.

According to still further features in the described preferred embodiments attributing the points is by a dynamically descending the points of the space in a direction of a gradient of the potential, into the plurality of local minima.

According to still further features in the described preferred embodiments the width σ, is selected so that a number of the clusters is stable under sufficiently small variation of the width.

According to still further features in the described preferred embodiments the method further comprising: (e) merging each cluster into a single point; (f) increasing the width; and (g) repeating the steps (a) to (d).

According to still further features in the described preferred embodiments the method further comprising iteratively repeating the steps (e) to (g), thereby defining a dendrogram of clusters.

According to still further features in the described preferred embodiments each biological entry is characterized by a plurality of genes, promoters, proteins, antibodies, physiological parameters and biochemical parameters.

According to still further features in the described preferred embodiments each biological entry is selected from the group consisting of a sample, a cell and a tissue.

According to still further features in the described preferred embodiments each biological entry corresponds to one subject at one time.

According to still further features in the described preferred embodiments the space spanning unit includes a dimension eliminator for eliminating at least one dimension from the dataset.

According to still further features in the described preferred embodiments the dimension eliminator includes: a matrix constructor for constructing a correlation matrix from the dataset; electronic-calculating functionality for calculating a set of eigenvalues of the correlation matrix; and an eigenvalues selector for selecting a subset of the set of eigenvalues.

According to still further features in the described preferred embodiments the dimension eliminator further comprises electronic-calculating functionality for diagonalizing and for normalizing the correlation matrix to a unitary diagonal correlation matrix.

According to still further features in the described preferred embodiments the matrix truncating unit includes: a matrix constructor for constructing a transformation matrix from the dataset-matrix; electronic-calculating functionality for calculating a set of eigenvalues of the transformation matrix; and an eigenvalues selector for selecting a subset of the set of eigenvalues.

According to still further features in the described preferred embodiments the matrix constructor includes; electronic-calculating functionality for forming a first matrix and a second matrix from an orthonormal set of vectors; a matrix multiplier for multiplying the dataset-matrix by the first matrix from the left and by the second matrix from the right.

According to still further features in the described preferred embodiments the first matrix diagonalizes $MM^T$ and the second matrix diagonalizes $M^TM$, where $M^T$ is a transpose representation of the dataset-matrix, M.

According to still further features in the described preferred embodiments the matrix constructor further includes a projector for projection each point in the truncated space onto a unit sphere in the truncated space.

According to still further features in the described preferred embodiments the eigenvalues selector is operable to select largest eigenvalues of the set of eigenvalues.

According to still further features in the described preferred embodiments the partitioning unit comprises: a density function determinator for determining a density function over the truncated space; a potential associator for associating a potential to the density function; a locator for locating a plurality of local minima of the potential; and a cluster builder for attributing, for each of the plurality of local minima, at least one of the points.

According to still further features in the described preferred embodiments the potential associator includes a model-constructor for constructing a physical analog quantum mechanical model over the space. the model having a Hamiltonian which includes the potential.

According to still further features in the described preferred embodiments the density function and the potential are each independently positive quantities.

According to still further features in the described preferred embodiments the density function is a sum of a set of kernels, one kernel for each of the plurality of points.

According to still further features in the described preferred embodiments each of the set of kernels represents a Hilbert space state.

According to still further features in the described preferred embodiments each of the kernels is substantially localized at one of the plurality of points, and characterized by a width, $\sigma$.

According to still further features in the described preferred embodiments the kernels have equal weights.

According to still further features in the described preferred embodiments each of the kernels has a predetermined weight.

According to still further features in the described preferred embodiments the kernels are Gaussians.

According to still further features in the described preferred embodiments the potential associator includes a model constructor for constructing a physical analog quantum mechanical model over the truncated space, the model having a Hamiltonian which includes the potential.

According to still further features in the described preferred embodiments the Hamiltonian equals $-0.5\sigma^2\nabla^2+V(x)$, where the V is the potential and x is a set of coordinates of the space.

According to still further features in the described preferred embodiments the density function is a ground state of the Hamiltonian.

According to still further features in the described preferred embodiments the potential associator includes an operator determinator for determining an operator in manner that the density function is an eigenfunction of the operator with an eigenvalue, E, the operator includes the potential.

According to still further features in the described preferred embodiments the operator determinator operable to select the eigenvalue, E, so that a minimal value of the potential is substantially zero.

According to still further features in the described preferred embodiments the operator determinator operable to include in the operator at least one additional term.

According to still further features in the described preferred embodiments the at least one additional term includes a kinetic term.

According to still further features in the described preferred embodiments the kinetic term comprises a Laplacian.

According to still further features in the described preferred embodiments the potential equals $E+(\sigma^2\nabla^2\psi)/2\psi$, wherein $\psi$ is the density function and E is calculated in accordance with the formula $E=-\min[(\sigma^2\nabla^2\psi)/2\psi]$.

According to still further features in the described preferred embodiments the locator is operable to evaluate the potential in a plurality of evaluation points, thereby to provide a plurality of potential values.

According to still further features in the described preferred embodiments the locator is operable to select at least one local minimal values of the potential values.

According to still further features in the described preferred embodiments each of the evaluation points is respectively one point of the truncated space.

According to still further features in the described preferred embodiments the cluster builder includes electronic-calculating functionality to dynamically descend the points of the truncated space in a direction of a gradient of the potential into the plurality of local minima.

According to still further features in the described preferred embodiments the density function determinator is operable to select the width $\sigma$, so that a number of clusters is stable under sufficiently small variation of the width.

According to still further features in the described preferred embodiments the apparatus further comprising an iterating unit for defining a dendrogram of clusters by performing a sequence of iterations.

According to still further features in the described preferred embodiments the iterating unit includes a width initiator for selecting an initial value of the width and a merging unit for merging each cluster into a single point.

The present invention successfully addresses the shortcomings of the presently known configurations by providing a method and apparatus for determining clusters far exceeding prior art.

Implementation of the method and apparatus of the present invention involves performing or completing selected tasks or steps manually, automatically, or a combination thereof. Moreover, according to actual instrumentation and equipment of preferred embodiments of the method and apparatus of the present invention, several selected steps could be implemented by hardware or by software on any operating apparatus of any firmware or a combination thereof. For example, as hardware, selected steps of the invention could be implemented as a chip or a circuit. As software, selected steps of the invention could be implemented as a plurality of software instructions being executed by a computer using any suitable operating apparatus. In any case, selected steps of the method and apparatus of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary, for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
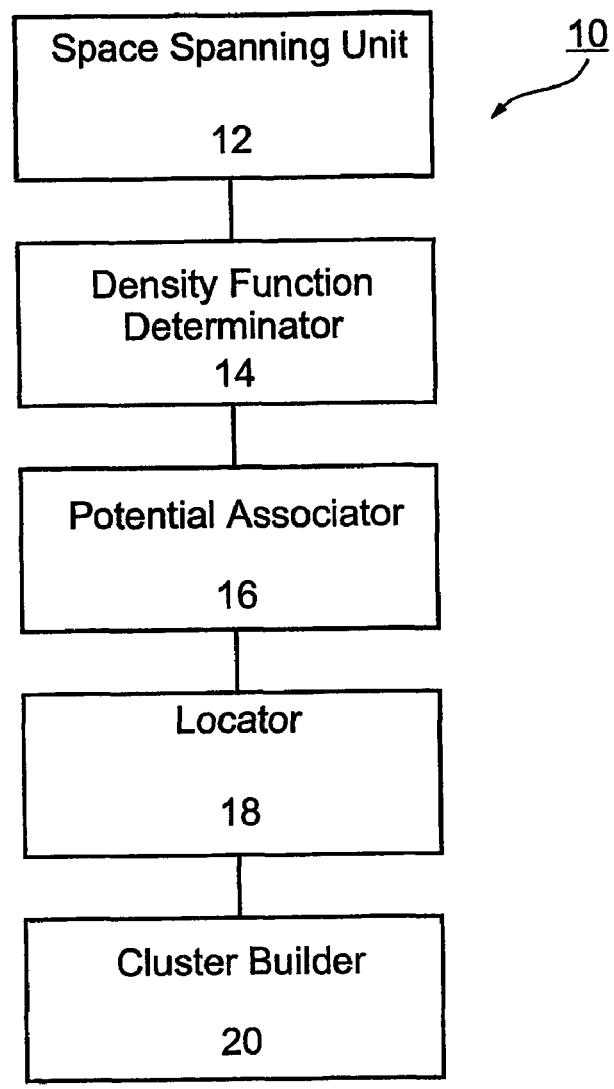
FIG. 1 is an apparatus for determining clusters, according to one aspect of the present invention.

The present invention is of a method and apparatus for determining clusters of multidimensional data, which can be used for analysis of large datasets. Specifically, the present invention can be used to obtain similarity clusters of a plurality of samples, cells or tissues, which are characterized by, e.g., expressed genes, expressed proteins, antibodies, physiological parameters and biochemical parameters.

The principles and operation of a method and apparatus for clustering data according to the present invention may be better understood with reference to the drawings and accompanying descriptions.

The quantum theory, in general, and specifically quantum mechanics, has been developed to describe physical systems at an atomic and sub-atomic scale. The present invention exploits quantum mechanical techniques for clustering of data. For the purpose of providing a complete and self contained description of the invention, an introductory explanation of the principles of quantum mechanics precedes the detailed description of the invention.

Quantum mechanics differs from classical mechanics in that it does not provide a unique prediction for the behavior of a system from a given initial configuration, but its predictions have a probabilistic nature. In quantum mechanics, a physical state of a system is specified by a wavefunction, and all possible information about the system can be derived from this wavefunction. According to the postulates of quantum mechanics, each state can be expressed as a superposition of all the wavefunctions of the system, hence, the wavefunctions of the system form a complete set of functions. Any physical observable corresponds in quantum mechanics to an operator which, upon acting on a state, may either transform this state into another one or it may just multiply the state by a number. In the latter case, it is said that the state and the corresponding number are respectfully an eigenstate. and an eigenvalue of the operator.

Mathematically, any quantum state can be considered as a vector in some abstract space called Hilbert space (this representation of quantum mechanics is attributed to Werner Heisenberg, 1901-1976). One way to define the components of a Hilbert space vector is by the coefficients in a complete set expansion of the state wavefunctions. Alternatively, all the wavefunctions, the superposition of which describes the physical state of the system, can be considered as components of a Hilbert space vector along some basis vectors. In Heisenberg representation of quantum mechanics, operators are matrices in a Hilbert space, and the action of an operator on a state is a multiplication of the corresponding vector by a corresponding matrix.

A typical example of a quantum mechanical operator is a Hamiltonian, H, which corresponds to the energy, E, of the system, i.e., the energy is the eigenvalue of the operator H. Every eigenstate of the operator H with eigenvalue E, either in wavefunction representation or in vector representation, satisfies the following equation, also commonly known as the Schrodinger (1887-1961) equation:

$$H\psi = E\psi, \tag{Eq. 1}$$

where ψ is an eigenstate of H. The eigenstate with the minimal eigenvalue. of a specific operator is called the ground state of the operator. In principle H may include a plurality of contributions, for example, a contribution of free motion (a kinetic term), a contribution of an interaction of the system with an external source (a potential term), a contribution of self interactions within the system and the like.

While conceiving the present invention, it has been realized that the principles and the mathematical techniques of quantum mechanics may be implemented on large datasets represented by a plurality of multidimensional data entries, for the purpose of obtaining similarity clusters.

Hence, according to one aspect of the present invention there is provided an apparatus for determining clusters, generally referred to herein as apparatus 10.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates apparatus 10 including a space spanning unit 12, a density function determinator 14 and a potential associator 16. According to a preferred embodiment of the present invention unit 12 serves for spanning a space, represented by a plurality of points, $x_i$ (i=1,2, ... ), which may be considered as a "working space" of the other components of apparatus 10. The space spanned by unit 12 may have any dimensionality which is preferably lower than or equal to the dimensionality of the dataset (the input of apparatus 10). Thus, for example, each point of the space may be defined as a multidimensional coordinate respectively representing one multidimensional data entry. It should be appreciated, however, that other definitions of the points may be used, as is further detailed hereinunder.

Determinator 14 serves for determining a density function which estimates the density of the dataset over the space spanned by unit 12. Density functions are known in the art. For example, so called Parzen density function is a set of equally weighted kernels. Hence, according to a preferred embodiment of the present invention, the density function is constructed as a weighted combination of a set of kernels each of which being substantially located at one of the points, $x_i$. Preferably, the kernels are characterized by a predetermined width, $\sigma$. Hence, the dataset is mathematically represented by the points, $x_i$, in the space spanned by unit 12, and each point is a center of a kernel, which can be viewed as a state in a Hilbert space.

Associator 16 serves for associating a potential, V(x), which is preferably chosen so that the density function corresponds to an eigenstate, $\psi$, with an eigenvalue, E, of a Hilbert space operator, H, which includes the potential, as described above with reference to Equation 1. Hence, according to a preferred embodiment of the present invention, a physical analog quantum mechanical model is constructed over the space. The model, represented by the Hamiltonian, H, corresponds to quantum states in a potential field V(x).

Beside the potential V(x), the operator H includes at least one additional term, which may be for example a kinetic term (e.g., a Laplacian operator, $\nabla^2$), or any other term which may be chosen so as to optimize the clusters which are obtained by apparatus 10, as further detailed herein.

According to a preferred embodiment of the present invention each of the clusters is represented by a set of points, one of which is identified as the center of the cluster, and all the other points of the set are respectively attributed to the center point. Hence, referring again to FIG. 1, apparatus 10 further includes a locator 18 and a cluster builder 20. Locator 18 serves for locating a plurality of local minima of the potential V(x), each minimum is a center of a different cluster, while cluster builder 20 serves for attributing, for each center, one data point as further detailed hereinunder.

Unlike a typical situation in a quantum mechanical system, the state, $\psi$, of the system is determined first, and the potential is actually associated with an (already known) eigenstate. For example, in a preferred embodiment of the invention the Hamiltonian may be defined in accordance with the equation:

$$H = -0.5\sigma^2 \nabla^2 + V(x). \quad \text{(Eq. 2)}$$

Given the eigenstate $\psi$, the potential V(x) which is associated with this eigenstate is preferably:

$$V(x) = E + (\sigma^2 \nabla^2 \psi)/2\psi. \quad \text{(Eq. 3)}$$

Equation 3 defines the potential up to the eigenvalue, E, which has to be explicitly determined. According to a preferred embodiment of the present invention the eigenvalue, E, is conveniently selected so as to ensure that the potential is a non-negative quantity. Specifically, $$E = 31 \min[(\sigma^2 \nabla^2 \psi)/2 \psi]. \quad \text{(Eq. 4)}$$

By selecting the eigenvalue, E, in accordance with Equation 4, it is ensured that the potential has a zero global minimum.

As stated, the eigenstate corresponds to the density function, which, according to a preferred embodiment of the present invention, is a weighted sum of localized kernels of width $\sigma$. The weights of the kernels may be either constant or they may vary, e.g., based on a previous knowledge of a relative importance of a specific datum over the others. According to a preferred embodiment of the present invention, the kernels may be any functions which are localized at a specific point, e.g., Gaussians. It should be understood, that the potential which is defined by Equation 3, develops at least one local minimum for other localized function as well. Each local minimum is identified with one cluster center.

The local minima of the potential V(x) may be located using any known method for finding local extremum points of a multidimensional function. For example. locator 18 may be operable to evaluate the potential in a plurality of evaluation points, thereby to provide a plurality of potential values, and then to select at least one local minimal values of these potential values. Although there exist a variety of known procedures for locating local minima of continuous functions, the complexity of such procedures may be relatively high. Hence, according to a preferred embodiment of the present invention, the efficiency of locator 18 may be substantially increased if the evaluation points are only near data points, since any cluster center is eventually located near at least one data point.

A skilled artisan will appreciate that the density function develops some local maxima within the space spanned by unit 12, which maxima could be identified with cluster centers. However, the alternative proposed by the present invention, of associating cluster centers with minima of the potential, has the advantage that minima of V are easy to locate.

An additional the advantage of the present invention is the ability to choose the eigenvalue, E, so as to set the scale on which local minima of the potential are observed. As further exemplified in the Examples section below, in cases in which E is relatively high, the density function spreads over a large region of the space covering more than one cluster center. Contrarily, the potential develops a larger number of local minima, thus allowing an identification of a correct number of cluster centers. Still another advantage of the present invention is that low minima of V are stable with respect to variation of the scale parameter.

Once the cluster centers have been located, cluster builder 20 attributes additional points to each cluster center, thereby builds a cluster near every cluster center. As further detailed hereinunder, unit 12 may considerably reduce the dimensionality of the dataset which is investigated.

Specifically, although rarely, a two-dimensional space may be spanned. In preferred embodiments of two-dimensional space, points are attributed to clusters by visual means. This may be done by more than one way. For example, it is convenient to construct a two dimensional contour plot, representing equipotential lines of the potential, and to identify local minima similarly to the way in which mountains and valleys are identified on a topographic map. Alternatively, local minima may be illustrated by constructing a three-dimensional plot of the potential over a planar image of the points of the space, and, again, attribute points which are within a predetermined distance from each local minimum. A third alternative is to transform potential values to predetermined colors and to illustrate local minima on a density plot where different regions of colors corresponds to different potential values. In any case, clusters of points are visually obtained from all the points which are within the basin of attraction of each local minimum.

The present invention successfully provides a well defined procedure for attributing points to cluster centers also for multidimensional space. Hence. according to a preferred embodiment of the present invention points may be attributed to cluster centers by a dynamically descending of points in a direction of a gradient of the potential, into the local minima. This procedure is also known as a gradient descent algorithm [R. O. Duda, P. E. Hart, and D. G. Stork "Pattern Classification", Wiley, New York (2001), the contents of which are hereby incorporated by reference], which mathematically formulated in the following way.

Defining for the ith datum point a time-dependent dynamical process according to which, at each time interval, $\Delta t$, the point "falls" closer to the cluster center. The dynamical process is preferably in accordance with the equation:

$$y_i(t+\Delta t)=y_i(t)-\eta(t)\nabla V(y_i(t)),\qquad\text{(Eq. 4)}$$

where $y_i(t)$ represent the location of the ith point at time t, and $\eta(t)$ is a descent rate which is selected in order not to miss a local minimum and skip to an adjacent one. $y_i(0)$ is selected to be the initial location of the point being descended.

Other method known in the art may also be used by cluster builder 20 so as to attribute points to cluster centers. For example, more sophisticated minimum search algorithms can be found in W. H. Press, S. A. Teuklosky, W. T. Vetterling and B. P. Flannery, "Numerical Recipes—The Art of Scientific Computing", 2nd ed. Cambridge Univ. Press, 1992, the contents of which are hereby incorporated by reference.

Once the cluster centers have been identified and additional points have been attributed to each center, a set of clusters is determined. According to a preferred embodiment of the present invention the density function has a free parameter, which is the width of the kernels, $\sigma$, characterizing the length scale over which clusters are searched. Varying $\sigma$ one can have any number of clusters, from one cluster, in the case of very high values of $\sigma$, to N clusters in the case of low value of $\sigma$, where N is the number of data entries. Hence, it is important to ensure that $\sigma$ is selected so that the number of the clusters is stable under sufficiently small variation of said $\sigma$.

The possibility to vary the width, $\sigma$, may also be exploited to provide a hierarchical formulation in an agglomerative manner. Hence, according to a preferred embodiment of the present invention, the width is iteratively increased so as to provide a dendrogram of clusters. Specifically, starting out with a very low $\sigma$, such that each point is a cluster of its own, then, $\sigma$ is increased by some amount obtaining a new set of cluster centers. Each of the new set of clusters is then considered as a single point for the next step of iteration, (again, with an additional increment of $\sigma$). The iterations are repeated until large $\sigma$ values are reached with only one cluster. On the way, the above procedure defines a dendrogram whose clustering quality may be compared to biological sample data.

As stated hereinabove, the space, which is spanned by space spanning unit 12, may be of reduced dimensionality so as to enhance the performances of apparatus 10 and or the clustering method. The reduced dimensionality is achieved preferably by eliminating at least one dimension from the dataset. According to a preferred embodiment of the present invention this elimination may be done by any method known in the art.

According to one embodiment, the elimination of dimension is done by a method commonly known as principle component analysis (PCA). In PCA, a correlation matrix is constructed from the dataset, then a set of eigenvalues of the correlation matrix is calculated, and finally a subset of the set of eigenvalues is selected. The subset is preferably of the largest eigenvalues of the correlation matrix, which typically corresponds to the most "important" dimensions of the data. The correlation matrix is constructed based on correlations which are calculated between different components of each data entry, and are averaged over all the data entries. According to the presently preferred embodiment of the invention, any correlation matrix may be constructed, and more than one kind of correlation matrix may be obtained so as to optimize the clustering procedure. Thus, for example, the correlation matrix may be an autocorrelation matrix or a covariance matrix. The correlation matrix provides a natural basis to span the space, which basis is specified by the eigenvectors of the matrix which are known as the principal components of the dataset.

In many cases of interest, the dataset is provided as a huge association matrix, such as a gene-sample matrix, M, in which, e.g., each row corresponds to different sample and each column corresponds to different gene. The dataset may include other association matrices as well. For example, the columns may be samples, cells or tissues any of which being associated with rows of expressed genes, expressed proteins, antibodies, physiological parameters or biochemical parameters.

The main features of the data can be captured by a highly compressed form of the matrix, which forms a truncated space. For example, in a gene-sample matrix this truncated space can be expressed in terms of "eigengenes" and "eigensamples" with leading eigenvalues.

Hence, According to a second embodiment, the elimination of dimension is done by diagonalizing M, thereby providing a transformation matrix, $\Sigma$, and selecting a sub-matrix preferably having the largest eigenvalues of the transformation matrix. In principle, any non-singular matrix is diagonalized by multiplying it by diagonalizing matrices from the left and from the right. A typical diagonalizing matrix is formed from an orthonormal set of vectors. It would be appreciated, however, that since M may be a non-square matrix, there are two diagonalzing matrices each having an orthonormal set of vectors of different dimensions. According to a preferred embodiment of the present invention the two diagonalzing matrices are obtained from two different algebraic calculations.

The first matrix, $U_1$, is calculated so as to diagonal $MM^T$, and the second matrix, $U_2$, is calculated so as to diagonal $M^T M$, where $M^T$ is a transpose representation of M. Once the two matrices are obtained the transformation matrix is calculated using $U_1$ and $U_2$, in accordance with the equation:

$$\Sigma=U_1^T M U_2.\qquad\text{(Eq. 4)}$$

Similarly to the PCA detailed above, $\Sigma$ provides a natural basis which is specified by the eigenvectors of $\Sigma$.

According to a preferred embodiment of the present invention, irrespectively of the procedure which led to the truncated space, each of the data points represented in the truncated space of the association matrix is projected onto a unit sphere in the truncated space, to obtain a normalized basis to the space.

It is to be understood, that the above truncation procedure may be employed, irrespectively of the method and/or apparatus being used for the purpose of clustering. Hence, once the dataset-matrix has been truncated, as detailed hereinabove, any clustering procedure may be employed on a sub-matrix of $\Sigma$, so as to provide similarity clusters from the data-set.

Hence, according to another aspect of the invention, there is provided an apparatus for determining clusters of biological data within a dataset, the dataset is represented by a multidimensional dataset-matrix, M, the apparatus is referred to herein as apparatus 30.

Figure 2:
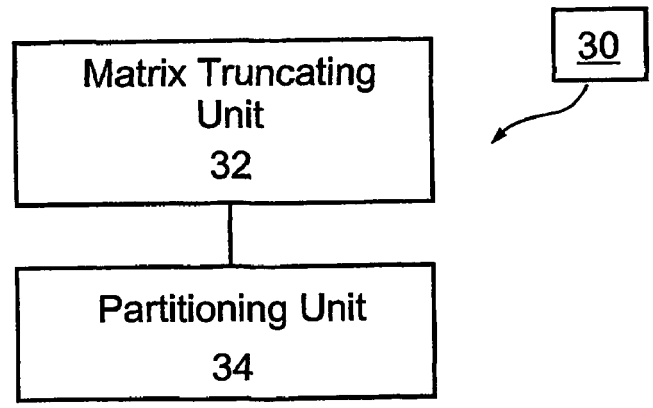
FIG. 2 is an apparatus for determining clusters, according to another aspect of the present invention.

Reference is now made to FIG. 2, apparatus 30 includes a matrix truncating unit 32 for truncating the dataset-matrix, M, so as to construct a truncated space having a reduced dimensionality, the truncated space is represented by a plurality of points, each representing one biological entry. Apparatus 30 further includes a partitioning unit 34 for partitioning said plurality of points, into a plurality of clusters.

According to an additional aspect of the invention, there is provided a method of determining clusters of data within a dataset, the dataset is represented by a plurality of multidimensional data entries. The method may be executed by a computer program and/or any other apparatus suitable for clustering (e.g. apparatus 10). The method includes the following sequential steps. Thus, according to the presently preferred embodiment of the invention, a first step includes spanning a space, represented by a plurality of points, as is further detailed hereinabove. In a second step of the method a density function is determined, in a third step a potential is associated to the density function, in a forth step a plurality of local minima of the potential are located, and in a fifth step clusters are obtained by attributing data one points to each local minimum.

According to yet an additional aspect of the invention, there is provided a method of determining clusters of biological data within a dataset, the dataset is represented by a multidimensional dataset-matrix, M. The method may be executed by a computer program and/or any other apparatus suitable for clustering (e.g. apparatus 30). The method includes the following sequential steps. In a first step the dataset-matrix, M, is truncated so as to construct a truncated space having a reduced dimensionality, the truncated space is represented by a plurality of points, each representing one biological entry, and in a second step of the method, the points are partitioned into a plurality of clusters.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

Crab Data

Crab data were taken from B. D. Ripley, "Pattern Recognition and Neural Networks", Cambridge University Press, Cambridge UK, (1996). The set contains 200 samples divided equally into four classes of crabs: two species, male and female each. This data set is defined over a five-dimensional parameter space. When analyzed in terms of the second and third principal components of the correlation matrix one observes a nice separation of the 200 instances into their four classes.

The correlation matrix which was used was the autocorrelation matrix.

Figure 3A:
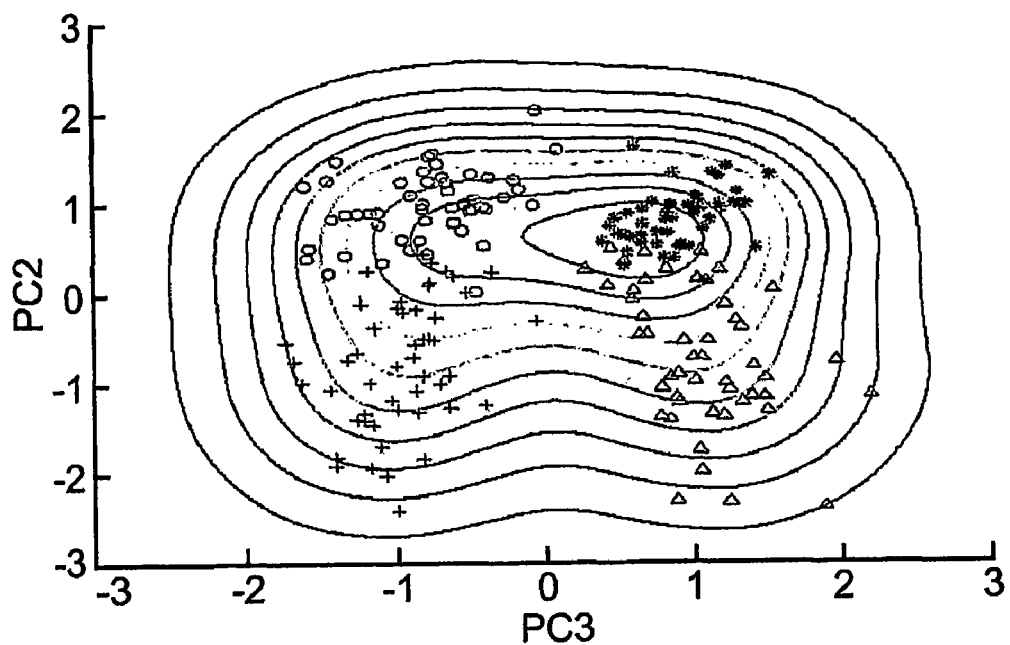
FIGS. 3a-b show data of a crab data set represented in a space of their second and third principal components as a contour plot (a) and a three dimensional plot (b) of Parzen density function.
Figure 3B:
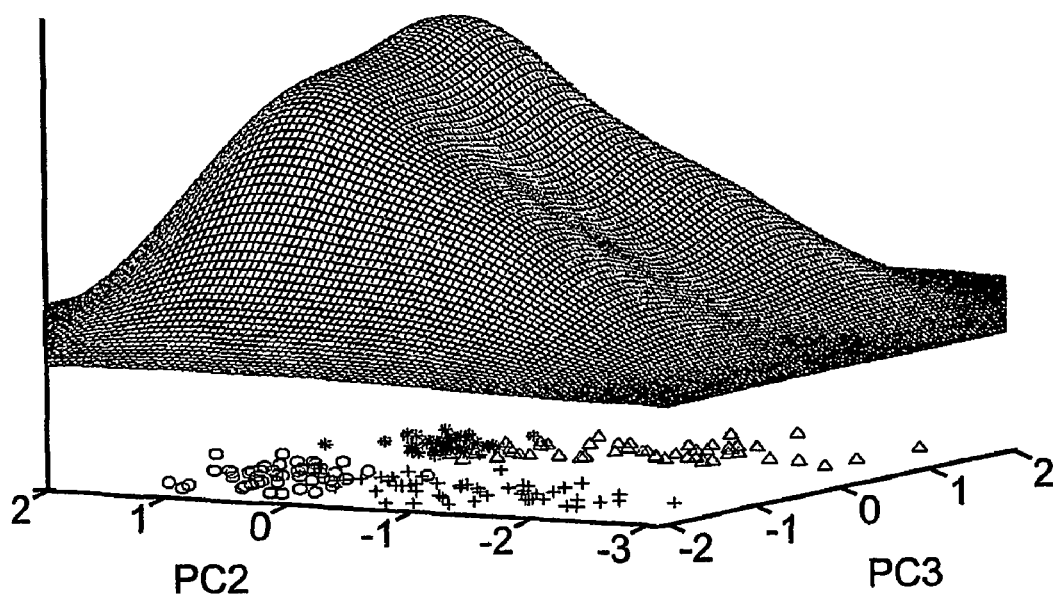

Reference is now made to FIGS. 3a-b, showing the second and third principal components of the data as well as a contour plot (FIG. 3a) and a three dimensional plot (FIG. 3b) of the density function, $\psi$, for width value of $\sigma^2=0.5$. It is quite obvious that this width is not sufficiently small to deduce the correct clustering according to a conventional approach which uses maxima of the density function.

Figure 4A:
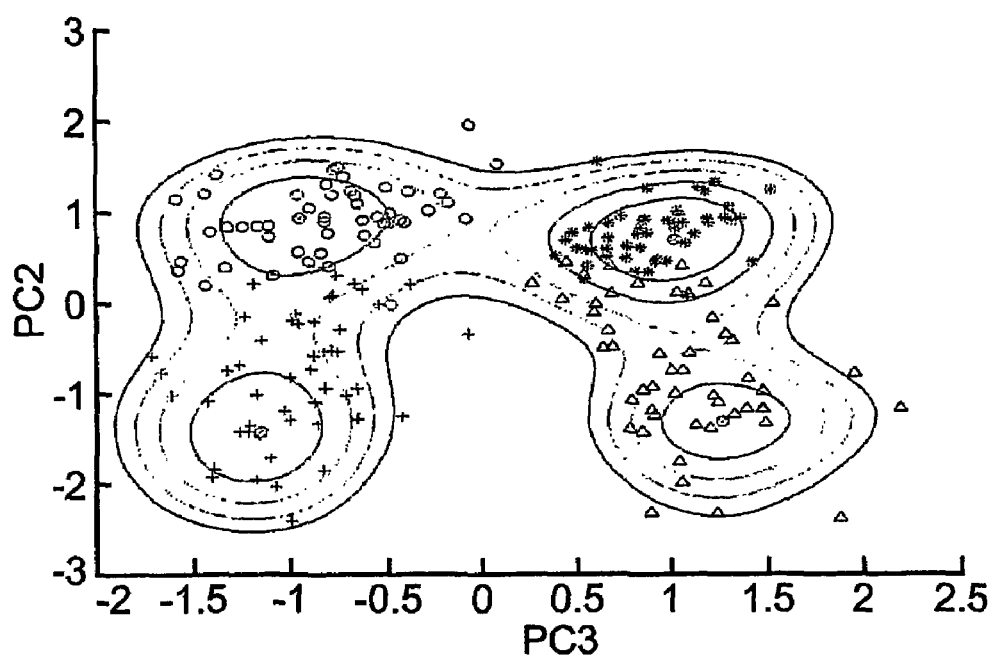
FIGS. 4a-b show the second and third principal components of the crab data and a contour plot (a) and a three dimensional plot (b) of a potential for $\sigma^2=0.5$.
Figure 4B:
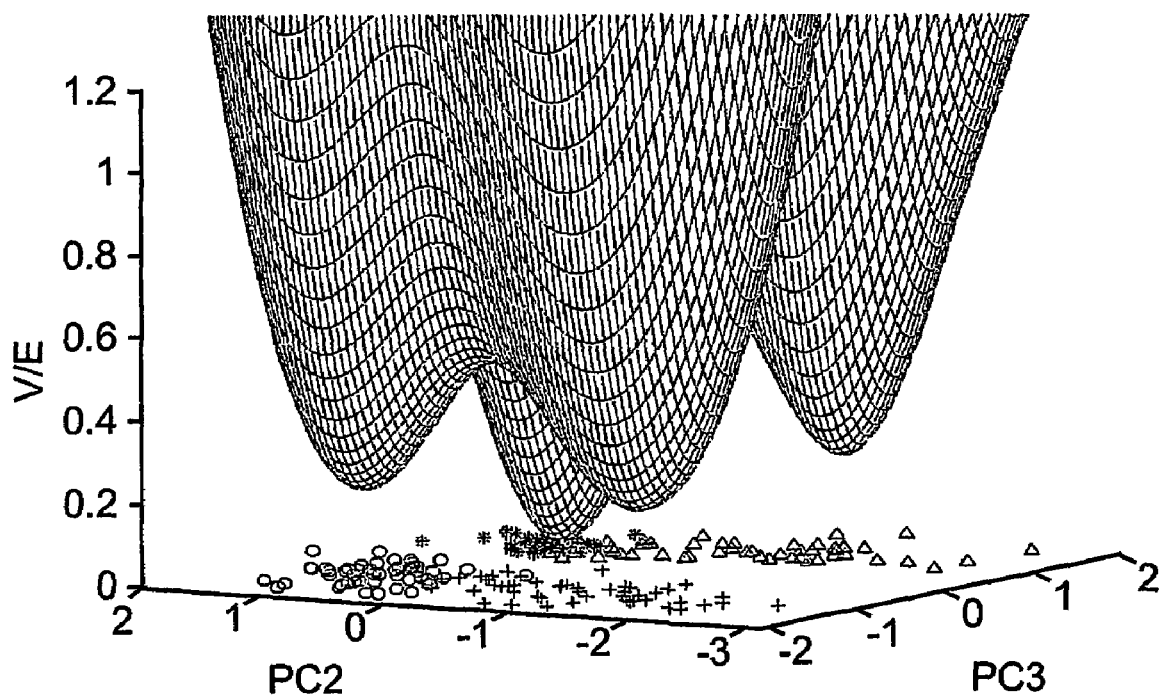

In FIGS. 4a-b, the crab data are shown together with contour plot (FIG. 4a) and a three dimensional plot (FIG. 4b) of the potential again with $\sigma^2=0.5$. The contours are set at values of V/E=0.2, 0.4, 0.6, 0.8 and 1. As can be seen from FIGS. 4a-b, there are four minima of the potential in accordance with the four clusters of the data. Thus, the necessary information is already available, for $\sigma^2=0.5$, one needs, however, the quantum clustering approach, to bring it out.

Figure 5A:
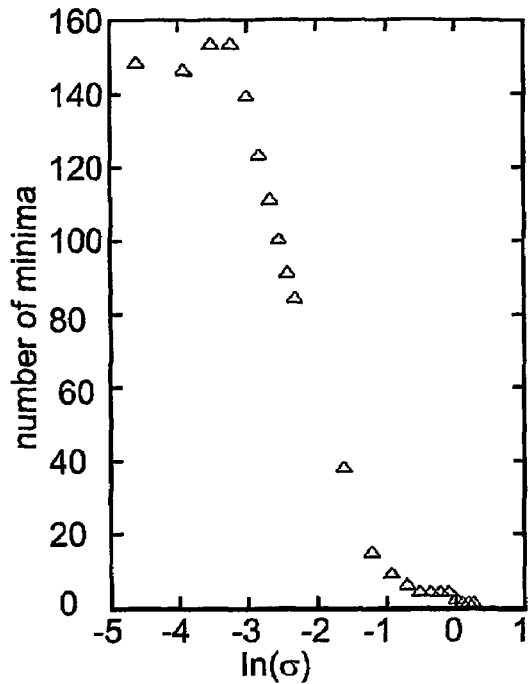
FIGS. 5a-d show plots of the number of minima of V (a,c) compared with the number of maxima of $\psi$(b,d), on a logarithmic scale of $\sigma$, and on a linear scale of $\sigma$, as calculated for the crab data.
Figure 5B:
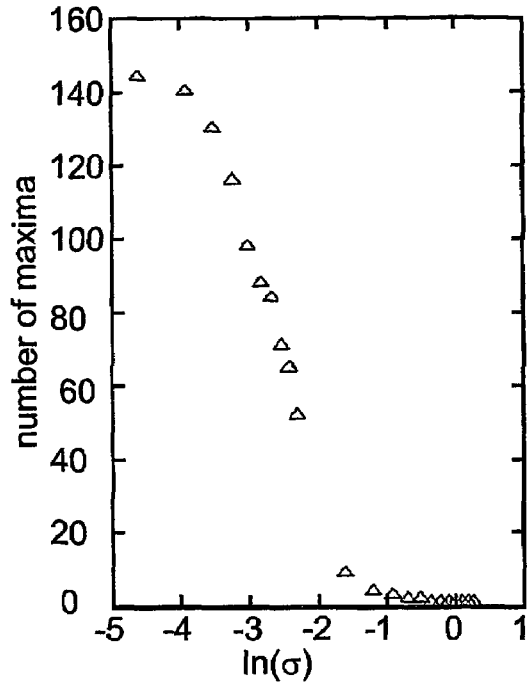
Figure 5C:
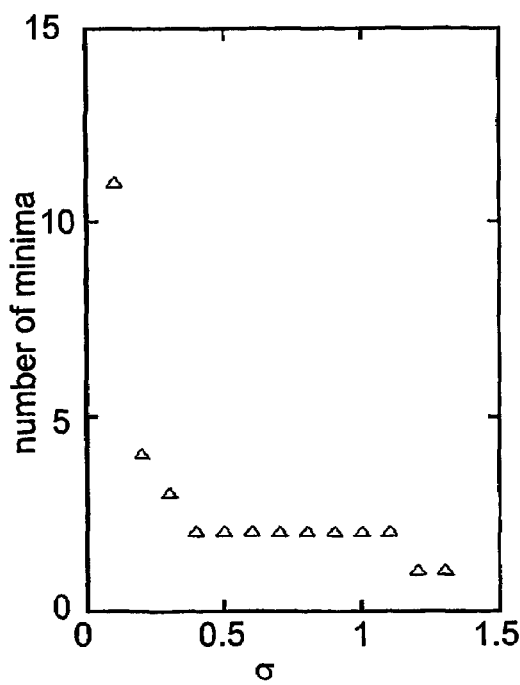
Figure 5D:
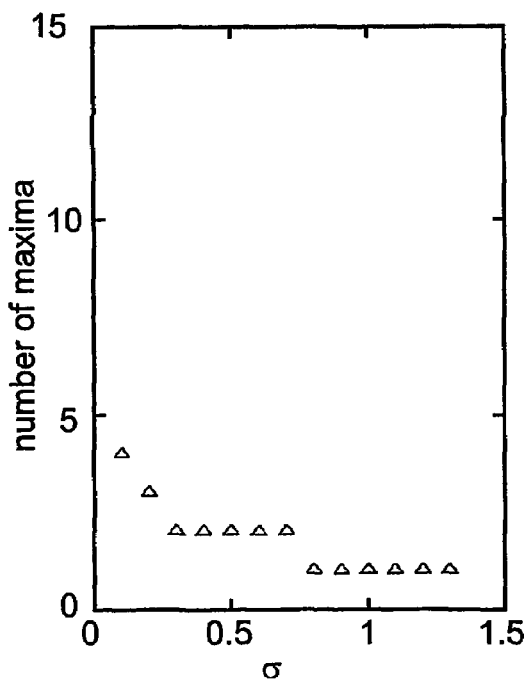

Another illustration of the differences between clusters obtained using maxima of $\psi$, to clusters obtained using minima in V, may be seen by comparing the stability of the solution to variations in $\sigma$. In FIGS. 5a-d, the number of minima of V is compared with the number of maxima of $\psi$. FIGS. 5a-b show, respectively, the number of minima of V and maxima of $\psi$, on a logarithmic scale of $\sigma$, and FIGS. 5c-d show the same on a linear scale of $\sigma$. The solution of 4 minima in V is stable over a wider range of $\sigma$ than the solution of 4 maxima in $\psi$.

Figure 6:
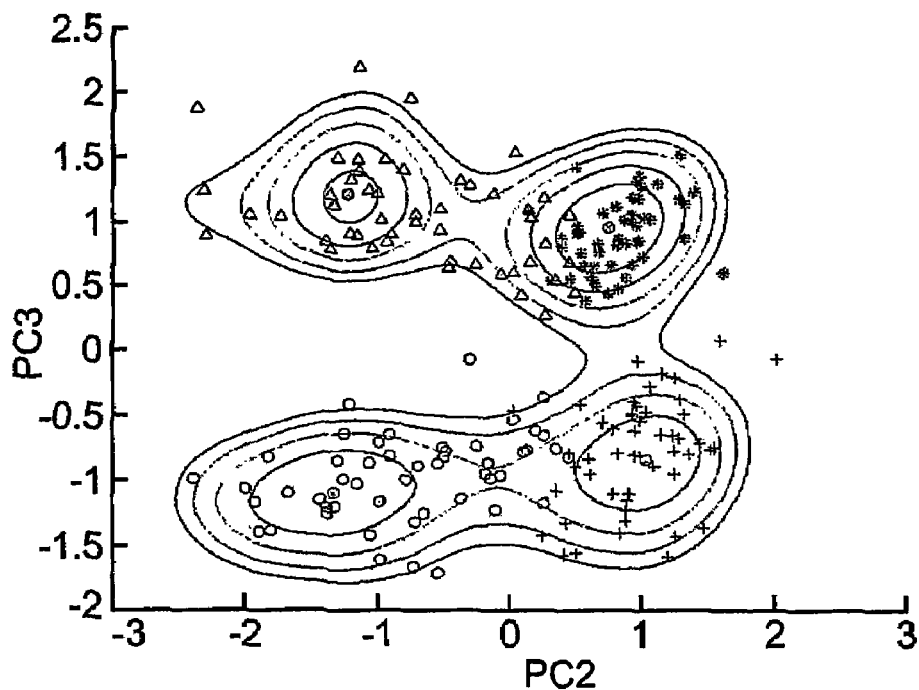
FIG. 6 shows a contour plot of the potential and obtained clusters of the crab data with $\sigma^2=\frac{1}{3}$.
Figure 7:
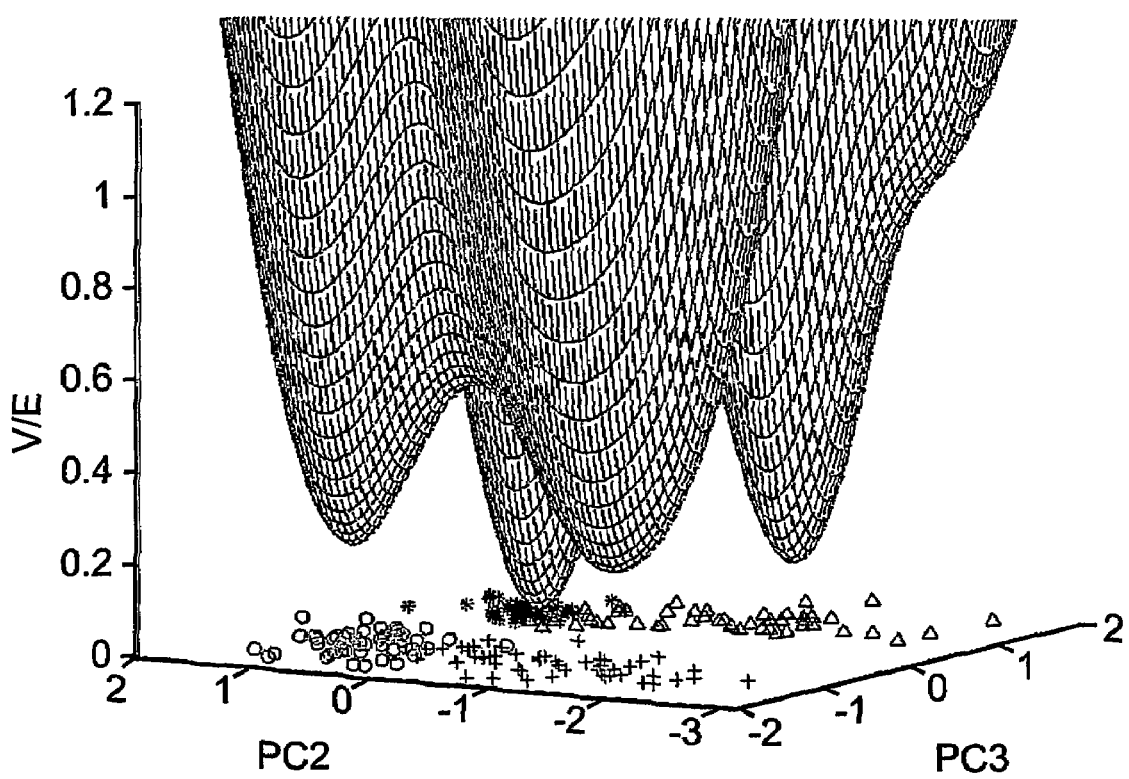
FIG. 7 shows a three-dimensional plot of the potential and obtained clusters of the crab data with $\sigma^2=\frac{1}{3}$.

Reference is now made to FIGS. 6 and 7, showing the obtained clusters with $\sigma^2=\frac{1}{3}$, together with contour plot (FIG. 6) and a three-dimensional plot (FIG. 7) of the potential.

Figure 8:
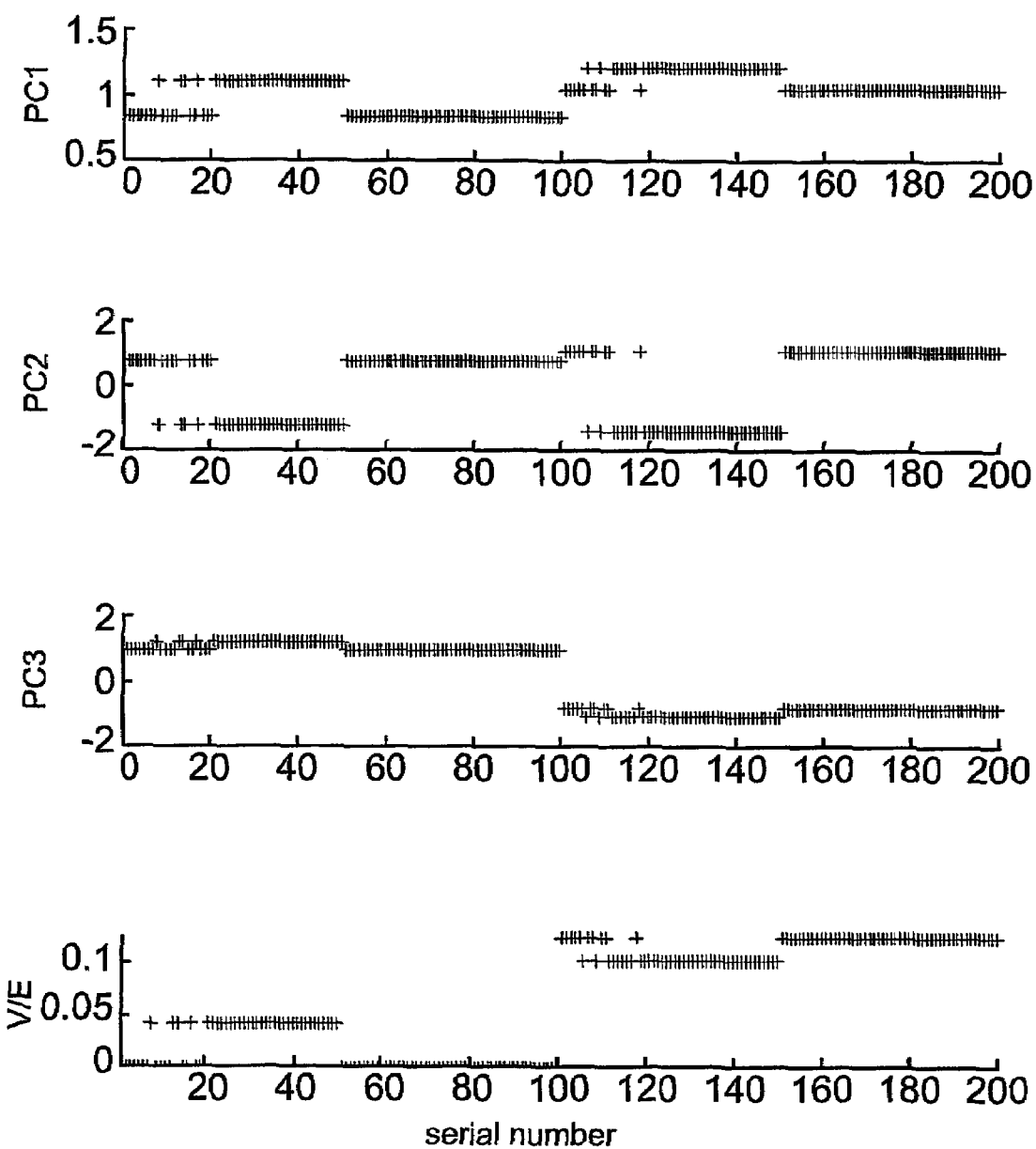
FIG. 8 shows gradient descent dynamics applied to the first three principal components of the crab data.

The gradient descent dynamics applied to the first three principal components of the crab data are illustrated in FIG. 8. The four clusters are clearly observed. Although there are a few misclassifications, it can be seen from FIG. 8 that the clusters agree quite well with the classes.

Figure 9:
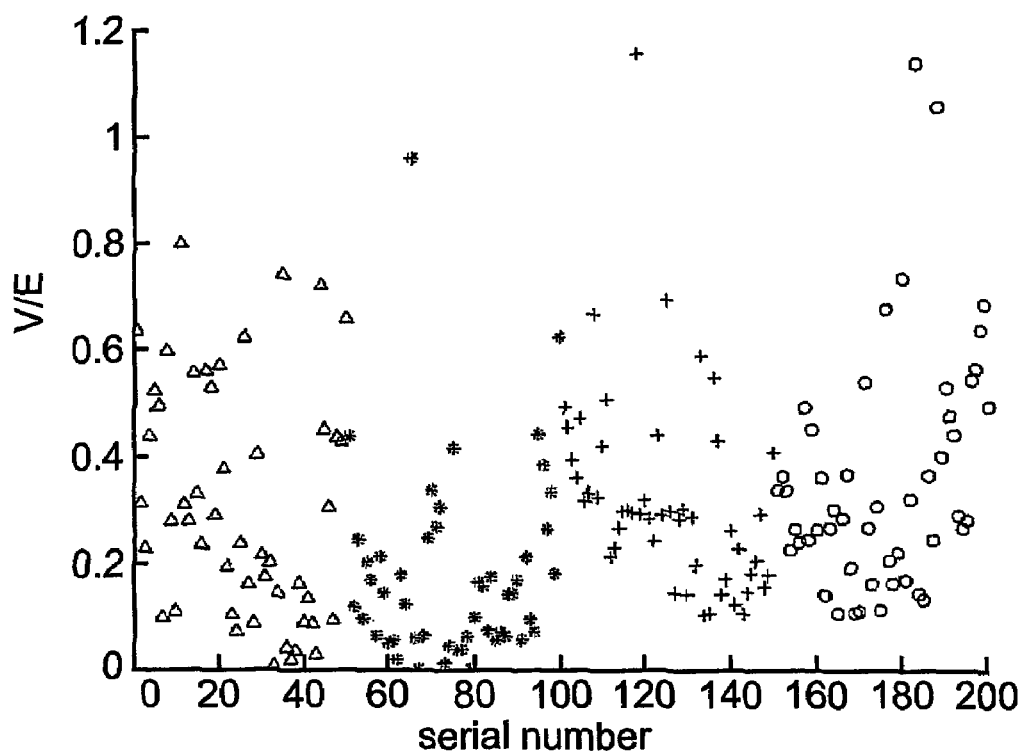
FIG. 9 shows a graph of values of a ratio between the potential and the eigenvalue as function of the serial number of the data.

In FIG. 9, values of a ratio between the potential V and the eigenvalue E, are shown as function of the serial number of the data. The clustering procedure was performed on the first three principal components of the crab data. Each data group is shown as a different symbol in FIG. 9. As can be seen, by using all data of V<0.3E one obtains cluster cores that are well separated in space, corresponding to the four classes that exist in the data. Only 9 of the 129 points that obey V<0.3E are misclassified by this procedure. Adding higher principle components, first component 4 and then component 5, leads to deterioration in clustering quality. In particular, lower cutoffs in V/E, including lower fractions of data, are required to define cluster cores that are well separated in their relevant spaces.

Example 2

Iris Data

The present invention was tested on an iris dataset of Fisher [R. A. Fisher, *Annals of Eugenics*, 7, 179 (1936)], obtained from C. L. Blake and C. J. Mer, "UCI Repository of machine learning databases" (1998). The data set contains 150 instances each composed of four measurements of an iris flower. There are three types of flowers, represented by 50 instances each. Clustering of these data in the space of the first two principal components, using σ=0.25, has an amazing result of only four misclassifications.

The correlation matrix which was used was the autocorrelation matrix.

Figure 10:
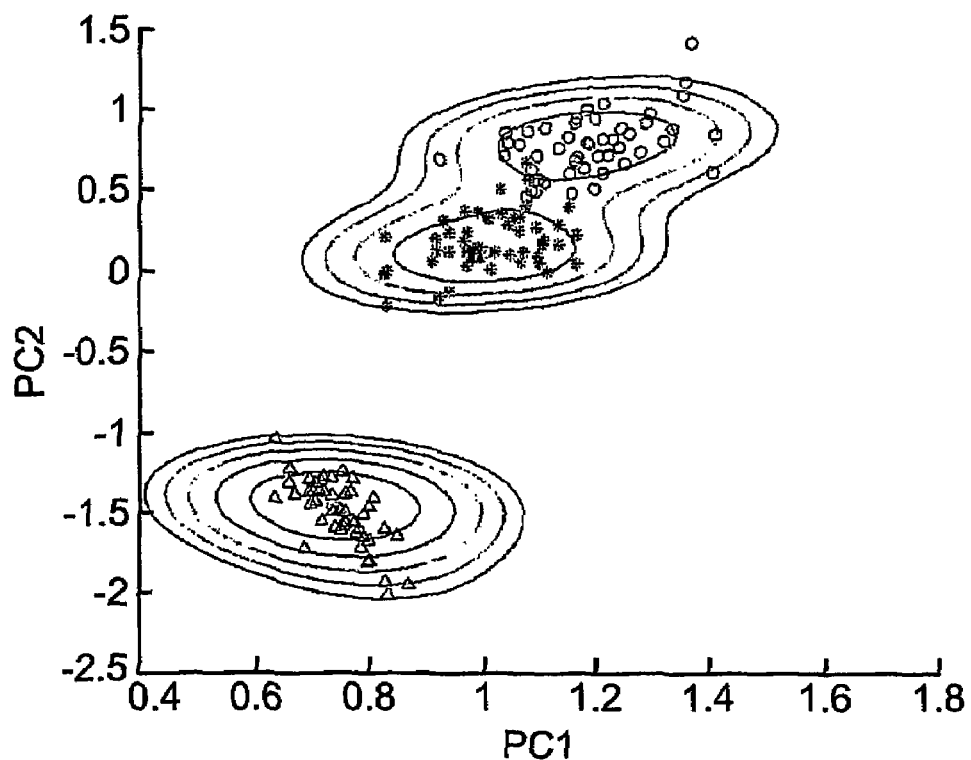
FIG. 10 shows a contour plot of the potential for the Iris data.
Figure 11:
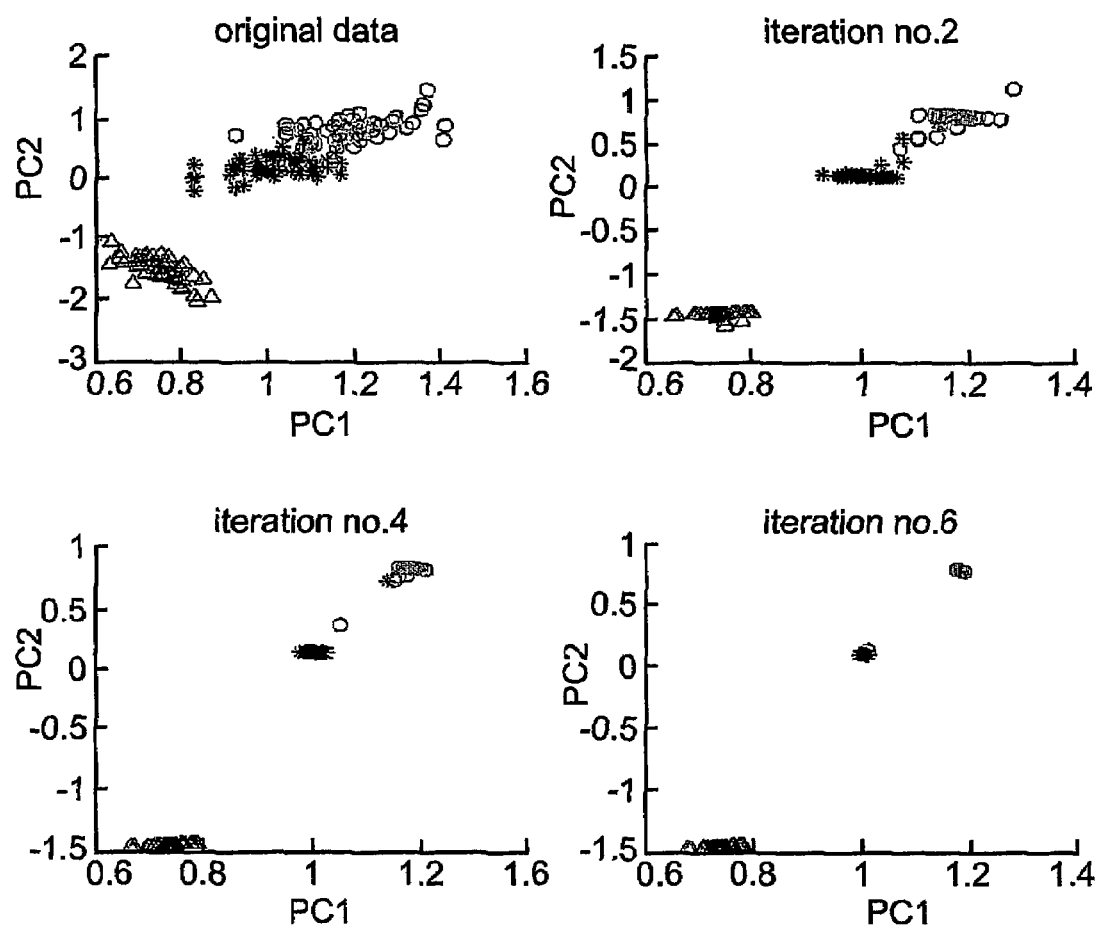
FIG. 11 shows snapshots of a progress of gradient descent dynamics for the Iris data set on principal components 1 and 2.

Reference is now made to FIG. 10, showing a contour plot of the potential for the iris data. The three minima are denoted by crossed circles and interpreted as cluster centers. The contours are set at values of V/E=0.2, 0.4, 0.6, 0.8 and 1.

Reference is now made to FIGS. 11a-d, showing the progress of the gradient descent dynamics for the iris data set on principal components 1 and 2. It can be seen how the data points are descending to the center of attraction.

Figure 12A:
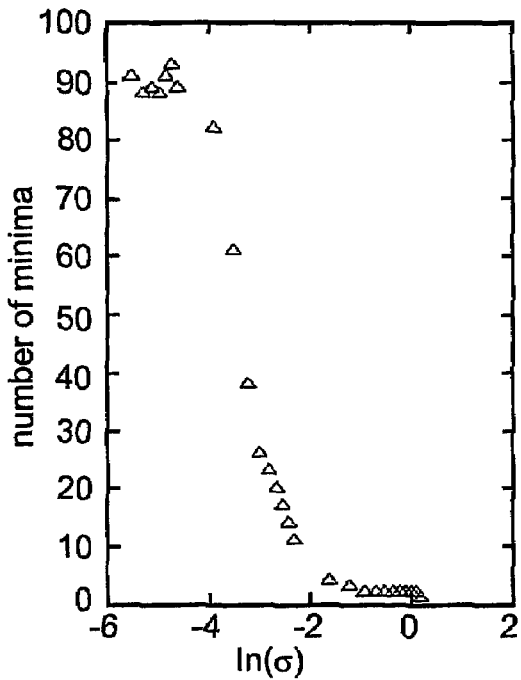
FIGS. 12a-d show plots of the number of minima of V (a,c) compared with the number of maxima of ψ(b,d), on a logarithmic scale of σ, and on a linear scale of σ, as calculated for the Iris data.
Figure 12B:
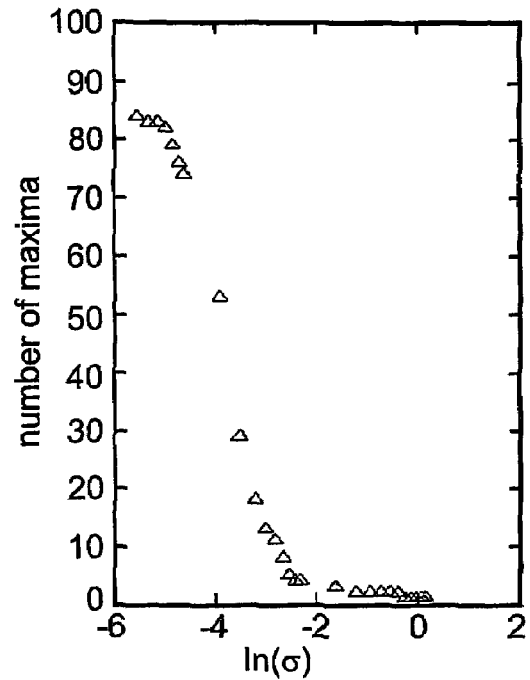
Figure 12C:
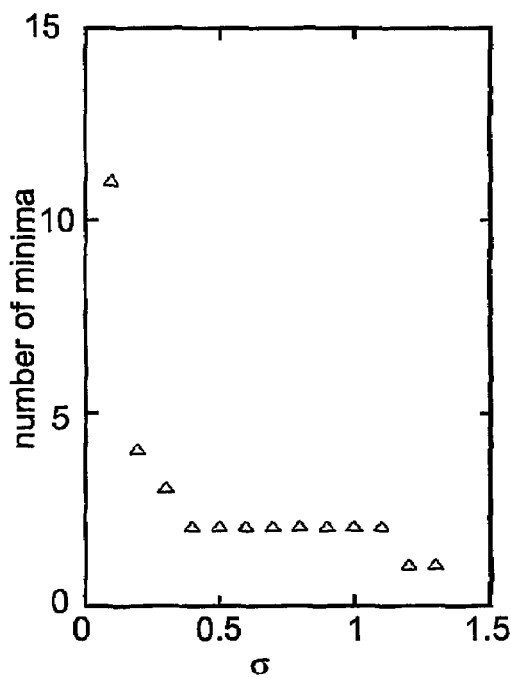
Figure 12D:
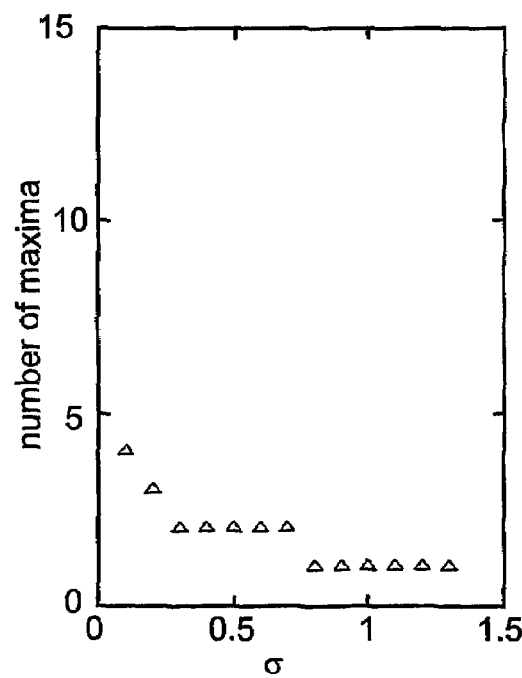

In FIGS. 12a-d, the number of minima of V is compared to the number of maxima in ψ, for the Iris dataset. FIGS. 12a-b show, respectively, the number of minima of V and maxima of ψ, on a logarithmic scale of σ, and FIGS. 12c-d show the same on a linear scale of σ. Although the correct number of clusters is 3, the solution of 2 clusters is stable over a wide range of widths both for the potential and the density function. This property of the Iris dataset was noted also in the literature for example, in an article of S. J. Roberts, R. Everson, and I. Rezek entitled "Maximum Certainty Data Partitioning", which was published in *Pattern Recognition* 33:5 (2000).

Figure 13:
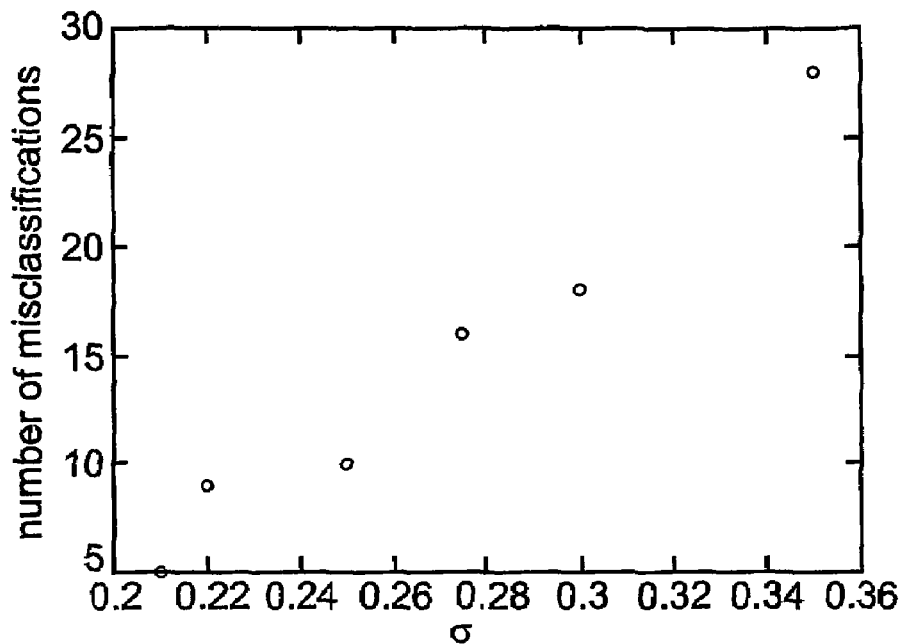
FIG. 13 shows the number of misclassifications as a function of σ, for the Iris data, using four dimensional raw data.

The present invention was applied to the Iris data in various ways. When applied to the data as represented in the original four dimensional space it led to misclassifications of the order of 15 instances, similarly to the clustering quality of M. Blat, S. Wiseman and E. Domany, *Phys. Rev. Letters* 76 3251 (1996). FIG. 13 illustrates the number of misclassifications as a function of σ, for the Iris data, using the four dimensional raw data.

Example 3

Wine Recognition Data

The present invention was tested on a wine recognition dataset obtained from C. L. Blake and C. J. Mer, "UCI Repository of machine learning databases" (1998). The dataset represents 13 different chemical constituents of 178 wines manufactured from grapes grown in the same region in Italy but derived from three different cultivars.

Due to the wide variation between the mean of the features, an additional linear normalization was performed on the dataset. The correlation matrix which was used was the covariance matrix.

Figure 14:
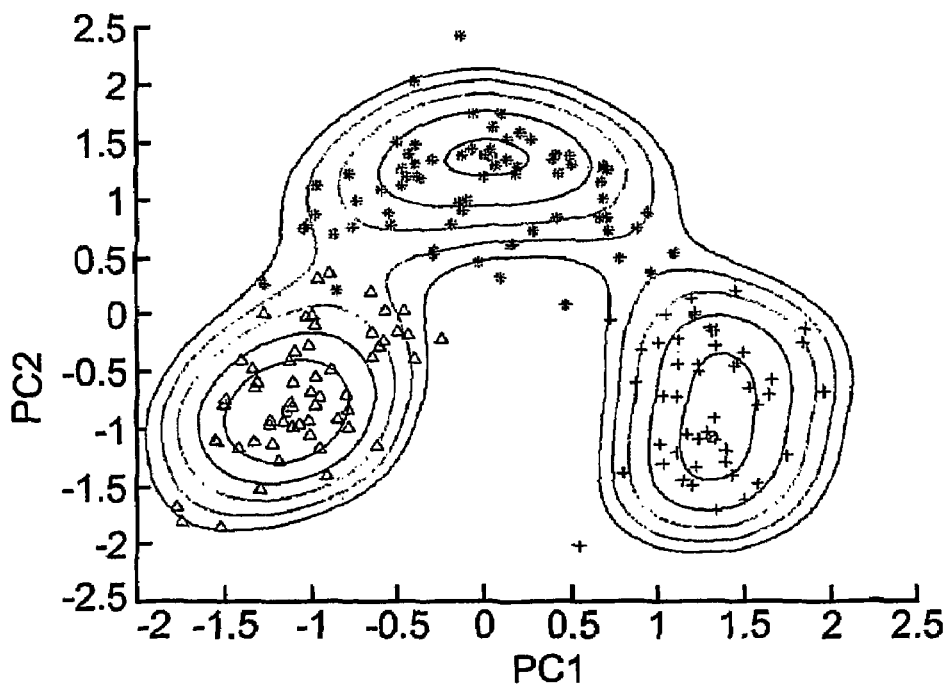
FIG. 14 shows the first and second principal components of the wine recognition data as well as a contour plot of the potential, for width value of σ=0.6.

Reference is now made to FIG. 14, showing the first and second principal components of the data as well as a contour plot of the potential, for width value of σ=0.6. The contours are set at values of V/E=0.2, 0.4, 0.6, 0.8 and 1. Beside six misclassifications, originally from the second cluster, the fit of the potential to the data is quite remarkable.

Figure 15A:
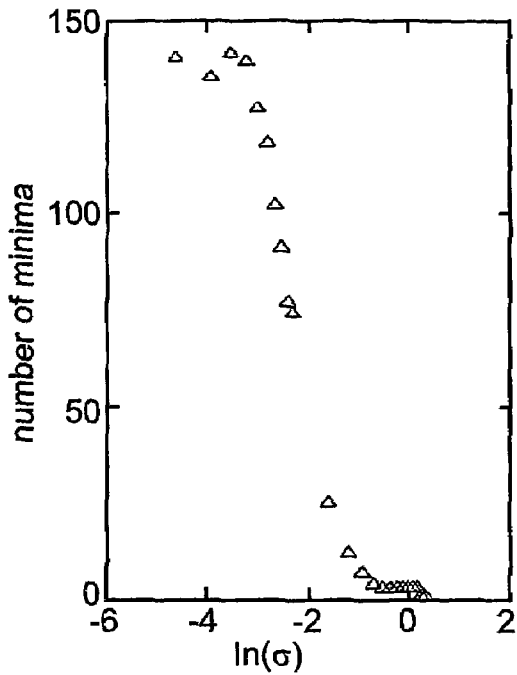
FIGS. 15a-d show plots of the number of minima of V (a,c) compared with the number of maxima of ψ(b,d), on a logarithmic scale of σ, and on a linear scale of σ, as calculated for the wine recognition data.
Figure 15B:
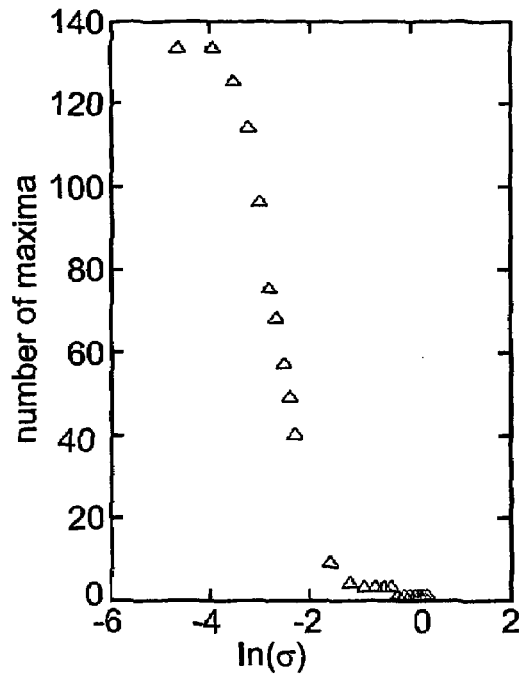
Figure 15C:
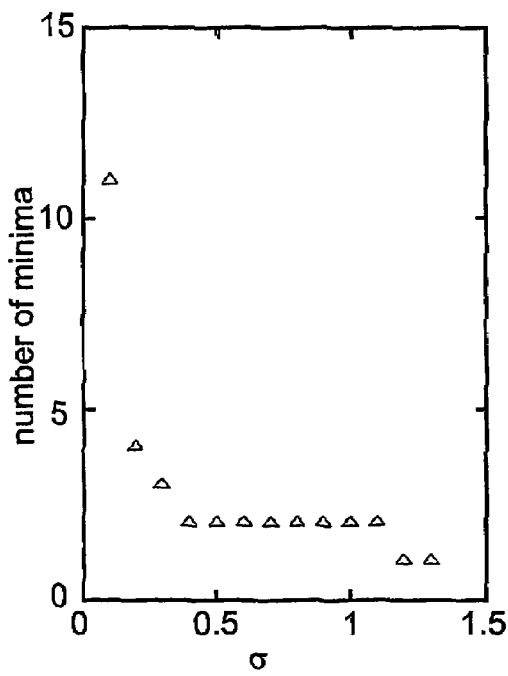
Figure 15D:
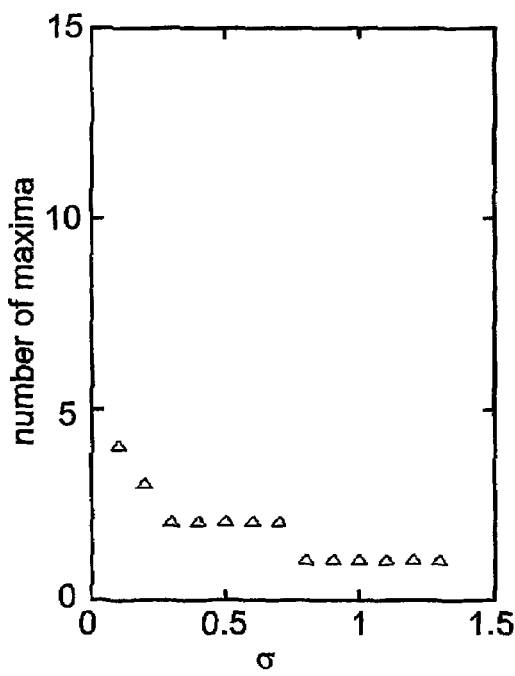

In FIGS. 15a-d, the number of minima of V is compared to the number of maxima in ψ, for the wine recognition dataset. FIGS. 15a-b show, respectively, the number of minima of V and maxima of ψ, on a logarithmic scale of σ, and FIGS. 15c-d show the same on a linear scale of σ. The change in number of clusters as a function of a exhibits the same behavior as was seen in the Iris and crabs examples. The solution of 3 clusters is the most stable.

Example 4

Forged Franc Bills Data

A dataset based on 200 Swiss thousand franc bills was obtained from Flury and Riedwyl (1988). The data consist of six variables, measured on 100 genuine and 100 forged bills.

The present invention was tested on the dataset both using a reduced two-dimensional space and a full six-dimensional space. The reduced two-dimensional space included the second and the third principal components. For the full six-dimensional space, a simple linear normalization was performed in order to put each of the six dimensions on the same scale.

Figure 16A:
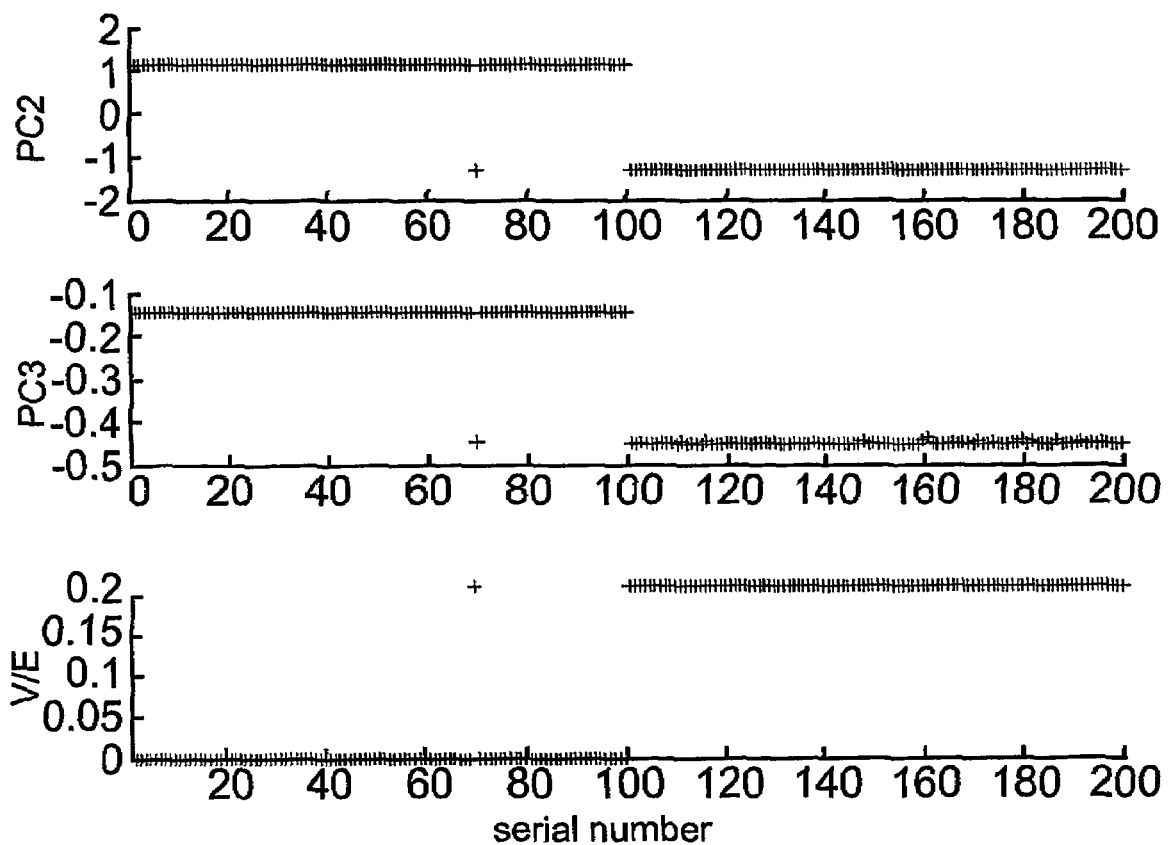
FIGS. 16a-b show plots of values of a ratio between the potential V and the eigenvalue E, as function of the serial number of the data, for two- and six-dimensional analysis of the Swiss franc bills, respectively.
Figure 16B:
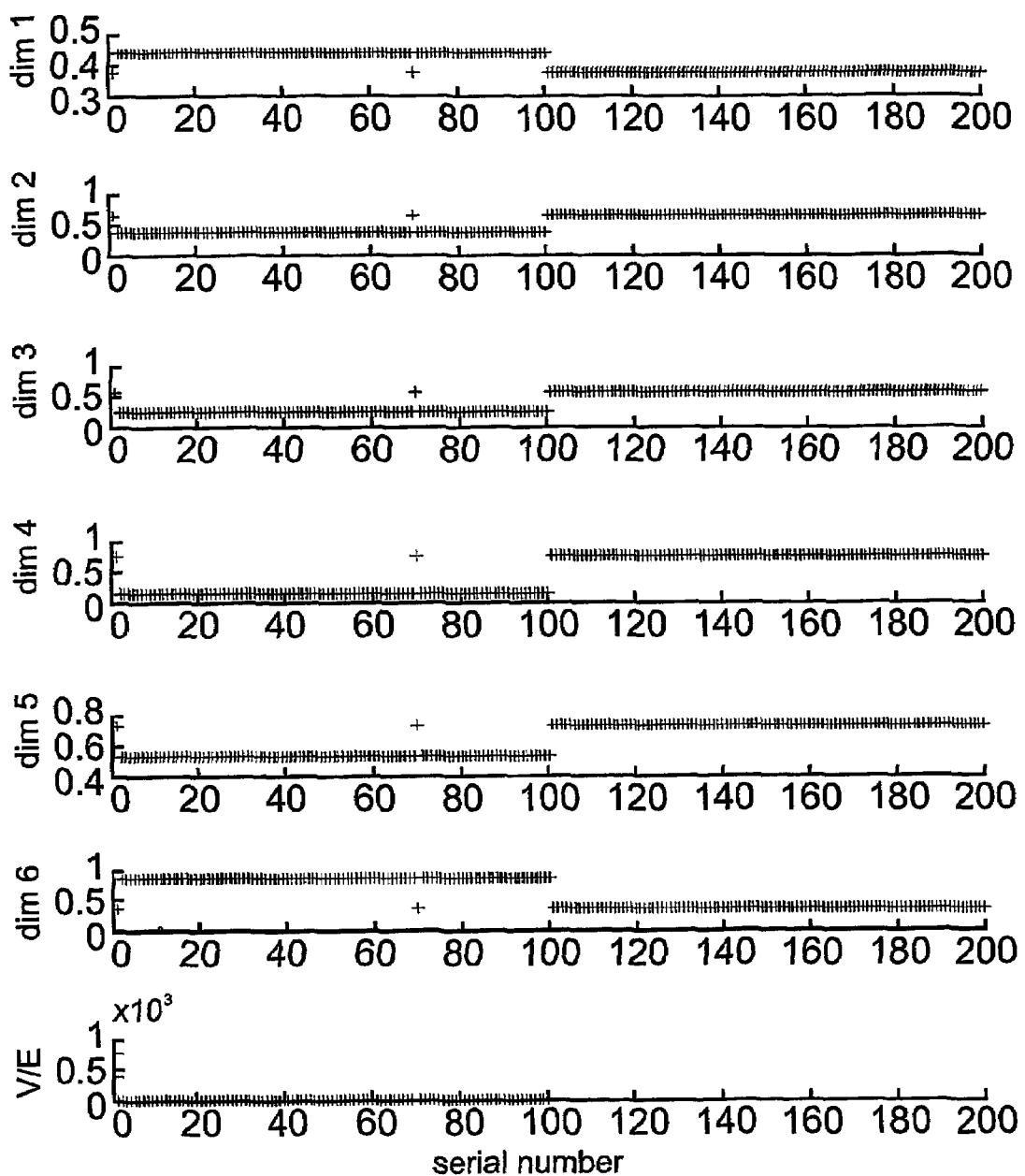
Figure 17A:
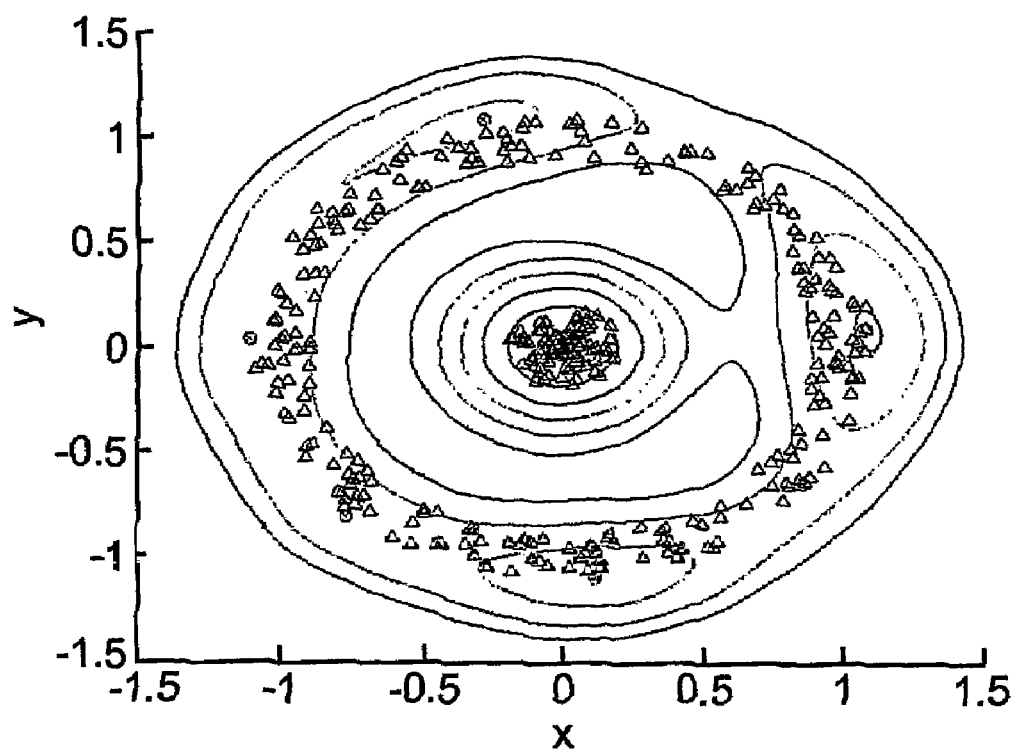
FIGS. 17a-d show contour plots of the potential for σ=0.4, 0.2, 0.3 and 0.1, respectively, as calculated for a Synthetic Ring Dataset.
Figure 17B:
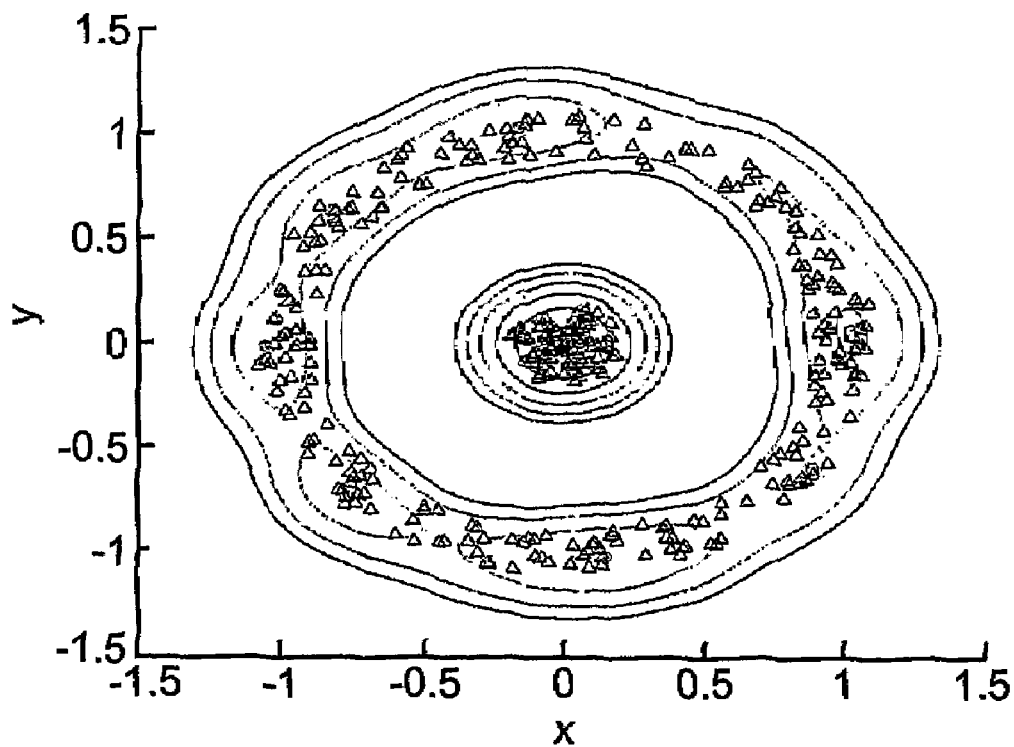
Figure 17C:
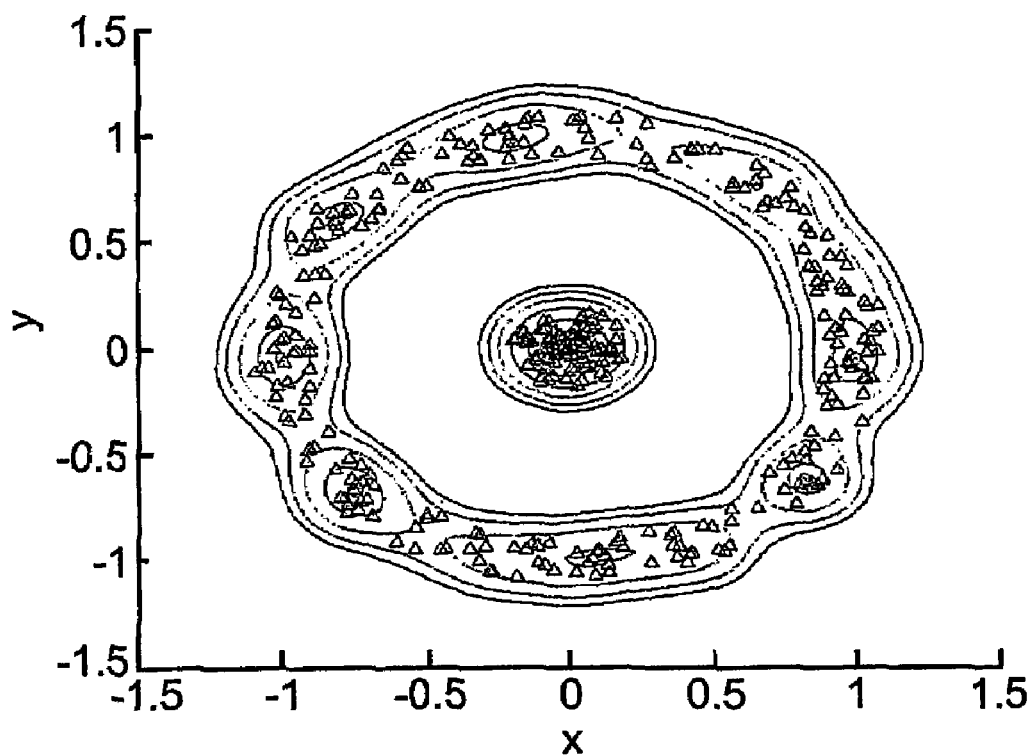
Figure 17D:
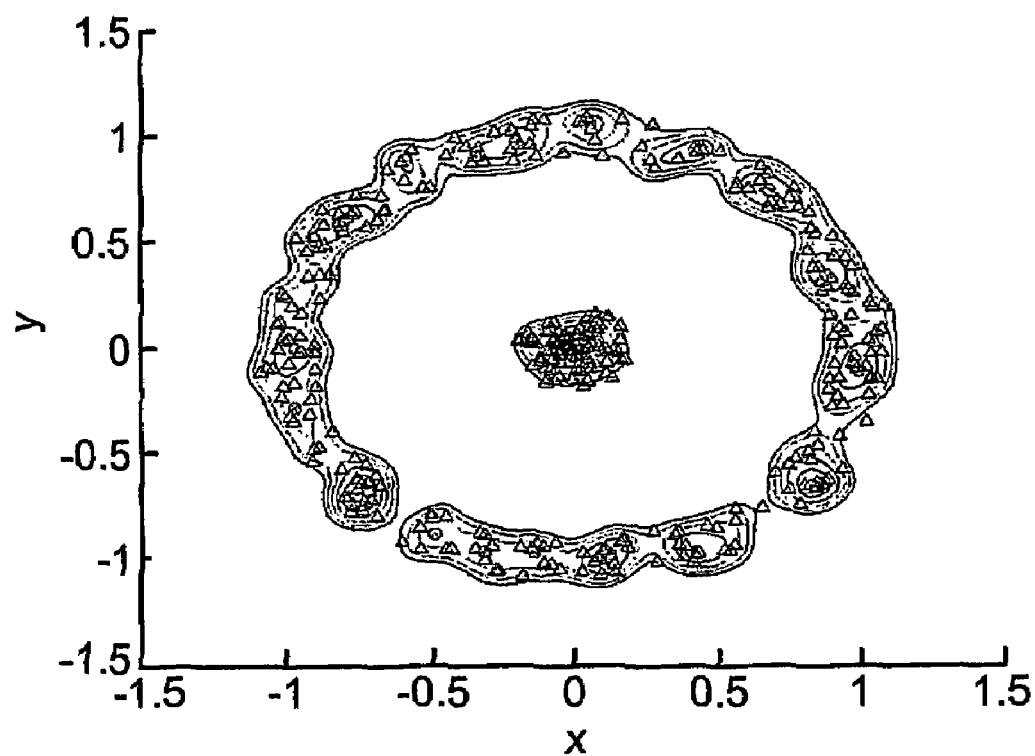

In FIGS. 16a-b, values of a ratio between the potential V and the eigenvalue E, are shown as function of the serial number of the data, for two- and six-dimensional analysis, respectively. Both analyses are satisfactory, with one misclassification for the two-dimensional analysis and two misclassifications for the six-dimensional analysis.

Example 5

Synthetic Ring Data

The present invention was tested on a dataset which has been synthesized by a computer. The synthetic dataset was shaped as a ring surrounding a sphere. The sphere consisted of 100 points and the surrounding ring consisted of 250 points.

In this example the algorithm wraps the data and separates the ring from the sphere, but exhibits several minima formed at the centers of local densities inside the ring.

Reference is now made to FIGS. 17a-d showing contour plots of the potential for σ=0.4, 0.2, 0.3 and 0.1, respectively. In each of the four figures, the contours are set at values of V/E=0.2, 0.4, 0.6, 0.8 and 1. The dynamical change in the shape of the clusters as a function of the width, σ, can be seen from the figures. A clear boundary between the sphere and the ring was observed for V=E, which is equivalent to zero-crossing according to Equation 3.

Example 6

Cancer Cells Data

NCI60 is a gene expression profile of 60 human cancer cells using 9,703 cDNAs representing approximately 8000 unique genes. The data were obtained from Scherf et al., "A gene expression database for the molecular pharmacology of cancer", *Nature Genetics* 24(3): 227-234 (2000). NCI60 includes cell lines derived from cancers of colorectal, renal, ovarian, breast, prostate, lung and central nervous system, as well as leukemia and melanomas. After application of selective filters the number of gene spots has been reduced to a 1,376 subset.

Quantum clustering was performed on a truncated 5 dimensional eigengene space.

Figure 18:
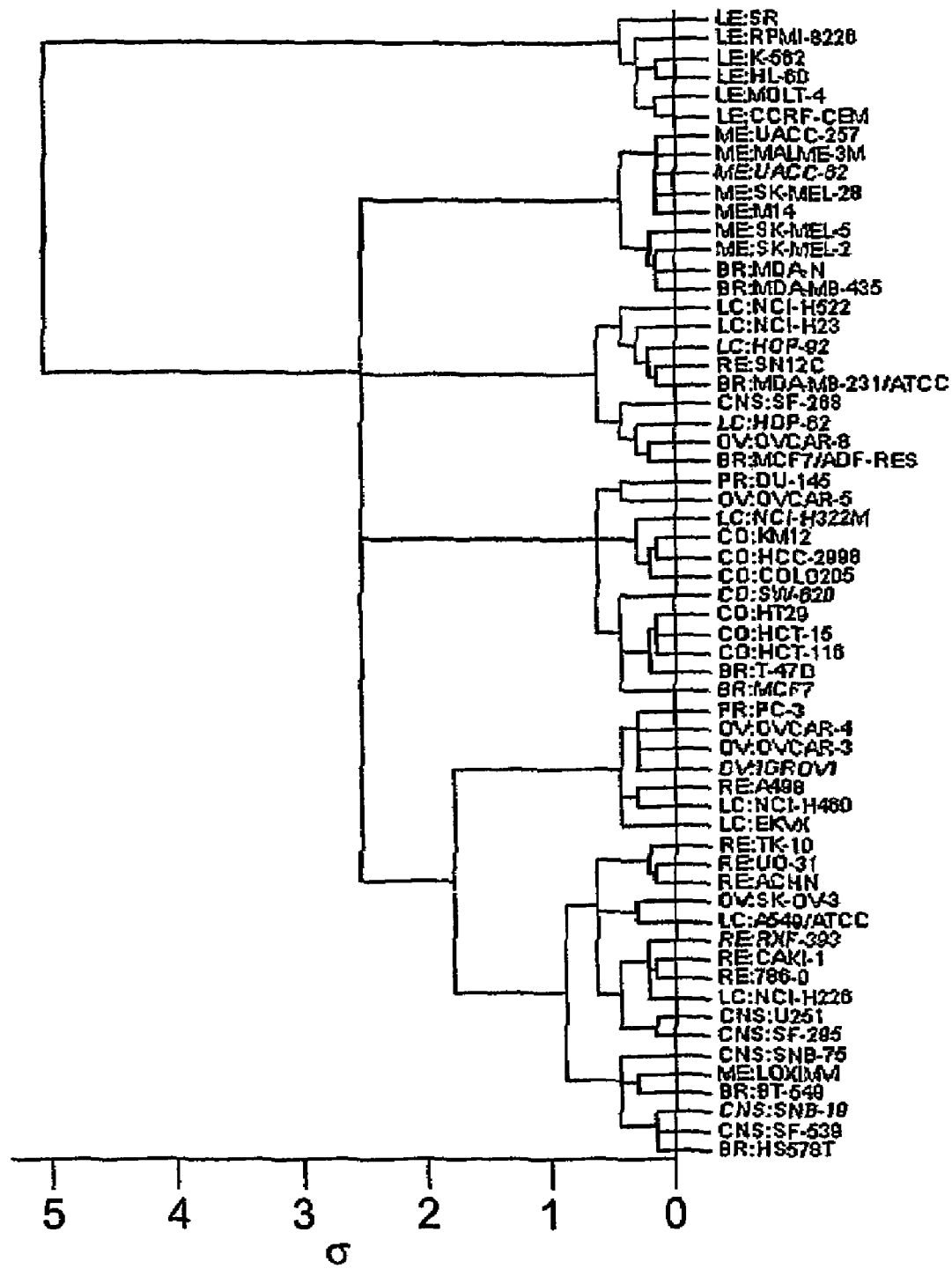
FIG. 18 shows a dendrogram of 60 cancer cell samples.

Reference is now made to FIG. 18, showing a dendrogram, of 60 cancer cell samples. The first 2 letters in each sample represent the tissue/cancer type. As can be seen in FIG. 18, at σ=0.2 one obtains many clusters, some including just one sample, others having 2-4 samples. From this point on a was increased by dividing it by a factor of 2 at each step. Around σ=0.5, one finds clustering into roughly the groups described by the first letters designating the cancer classes.

Figure 19:
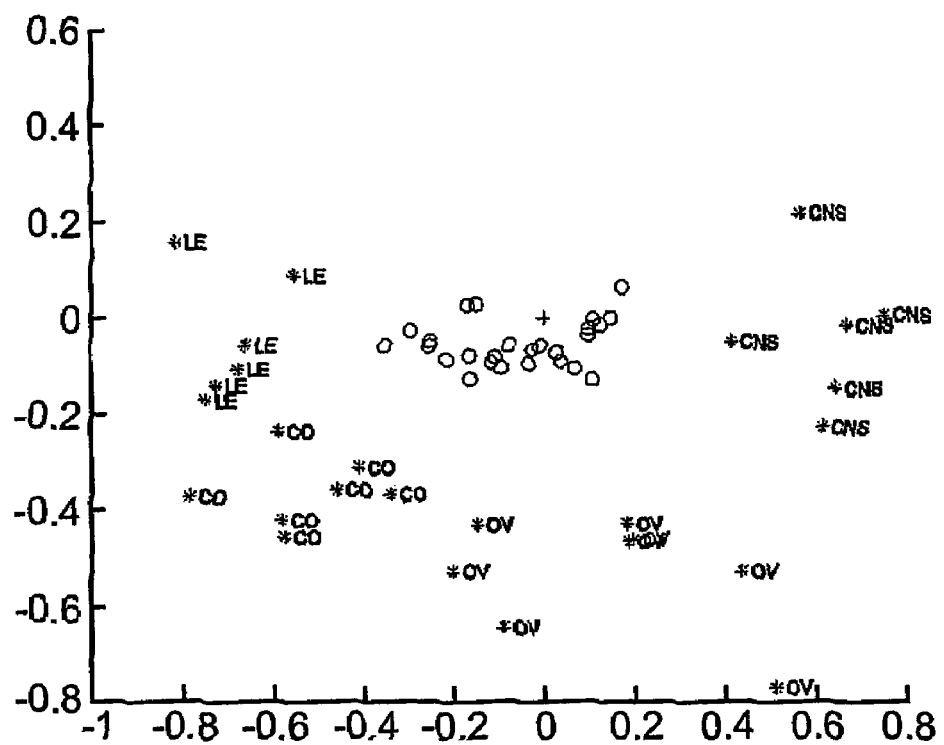
FIG. 19 shows a representation of data of four classes of cancer cells on two dimensions of the truncated space.

The effect of the projection onto the sphere in the truncated space may be better understood from FIG. 19. It is a representation of data of four classes of cancer cells on two dimensions of the truncated space. These data points (denoted by star and by the relevant letters) are shown after the normalization of each data point in the truncated space. The circles denote the locations of the data points before this normalization was applied. It is quite evident that this projection onto the sphere is an important preprocessing step for any clustering algorithm.

Example 7

Leukemia Patients Data

Data of 72 leukemia patients was obtained from Golub, et al., "Molecular classification of cancer: class discovery and class prediction by gene expression monitoring", *Science*, 286:531-537 (1999). The dataset includes 2 types of leukemia called ALL and AML. The ALL set is further divided into T-lineage leukemia and B-lineage leukemia and the AML set is divided into patients who have undergone treatment (with an anthracycline-cytarabine regimen) and those who have not. The microarray data correspond to 72 samples tested on 7129 genes.

The dataset was truncated down to 5 dimensions. Quantum clustering obtained four classes of the dataset, in conformation with the definition of the set. To describe the quality of the results a Jaccard score was calculated at each increment of $\sigma$. The Jaccard score is defined as $J=n_{11}/(n_{11}+n_{10}+n_{01})$, where, $n_{11}$ is the number of pairs of samples that appear in the same cluster both according to the cell type and according to the clustering method, and $n_{10}+n_{01}$ is the number of pairs that appear together in one classification and not in the other. This score should be 1 for perfect clustering and decrease as the clustering quality decreases.

Figure 20:
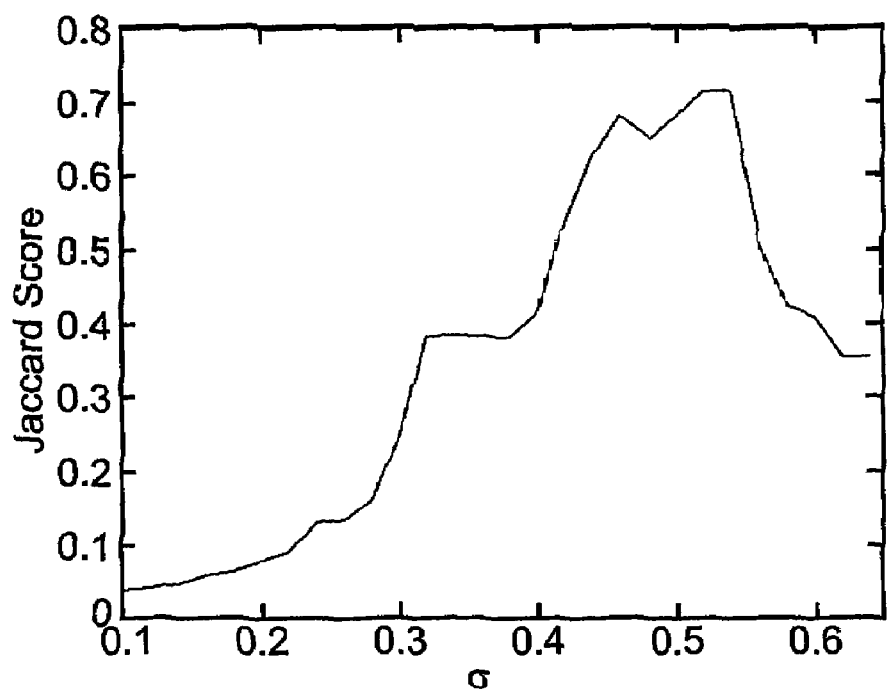
FIG. 20 shows a Jaccard measure for the AML/ALL set as function of σ.

Reference is now made to FIG. 20, showing the Jaccard measure for the AML/ALL set as function of $\sigma$. The best performance is obtained around $\sigma=0.5$, which is where four clusters is the preferred solution.

Figure 21:
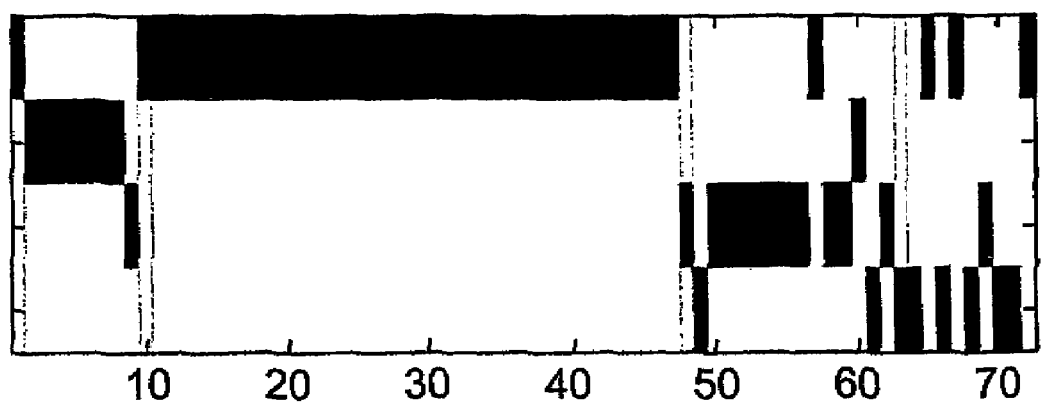
FIG. 21 shows a clustering solution for the AML/ALL set using σ=0.54.

FIG. 21, shows the clustering solutions for the AML/ALL set using $\sigma=0.54$. The samples are ordered on the x-axis according to the classification into four groups. Each new group starts with a grey line. The first two clusters are the ALL B-cells and T-cells, where only 2 (out of 47) misclassifications were observed.

Example 8

Yeast Cell Cycle Data

Yeast data were obtained from Spellman, et al., "Comprehensive Identification of Cell Cycle-regulated Genes of the Yeast Saccharomyces cerevisiae by Microarray Hybridization", *Mol. Biol. Cell* 9, 3273-3297(1998).

The purpose of the study was to test clustering of genes, whose classification into groups was investigated by Spellman, et al. The starting gene/sample matrix had dimensions of 798×72. The matrix was truncated to four dimensions. Once again, the best results were obtained for $\sigma=0.5$, where four clusters have been observed, whereas the original data were classified by Spellman, et al. into five classes. The resulting Jaccard score is 0.5. When two of the five classes were grouped into one, the score increased to 0.54. In other words, the clustering and classification have only a partial overlap.

Figure 22:
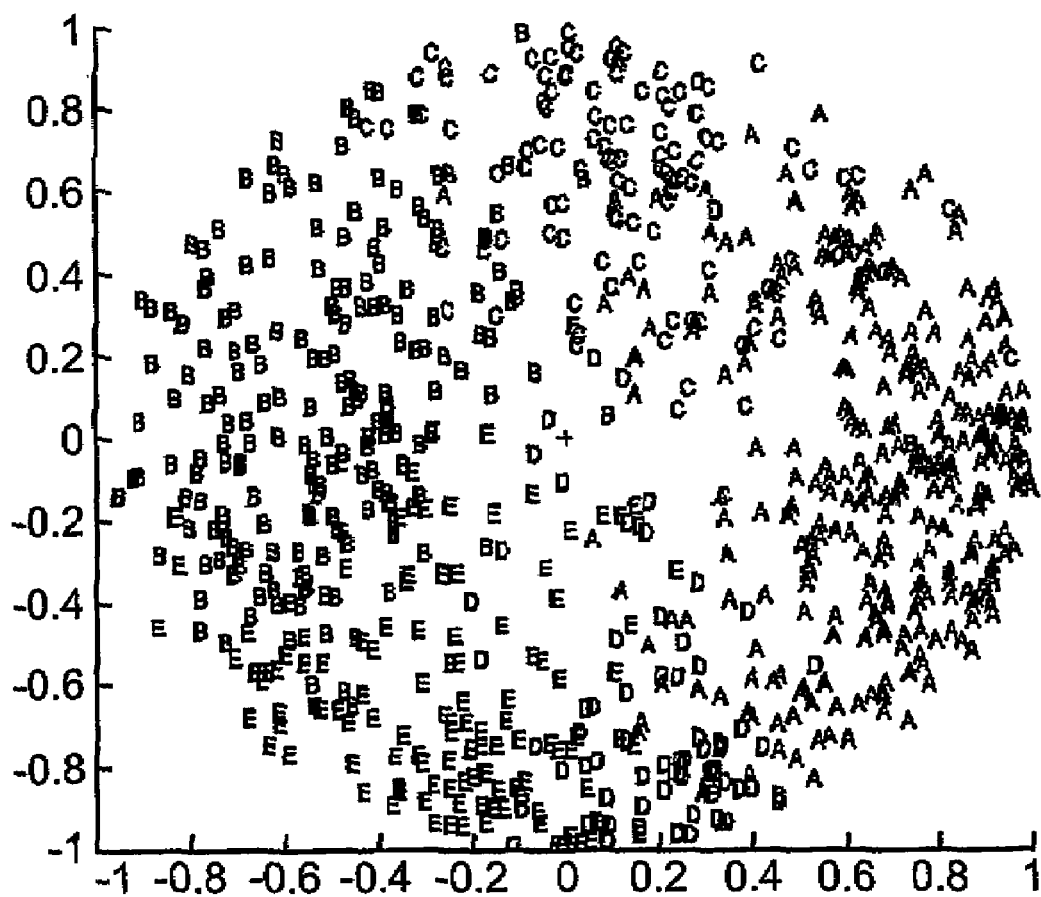
FIG. 22 shows a representation of five gene families in two coordinates of the four dimensional truncated space, as obtained from the yeast data.

In FIG. 22 the five gene families as represented in two coordinates of the four dimensional truncated space. Although the data are given in a high number (72) of dimensions, meaningful clustering can be seen.

Figure 23:
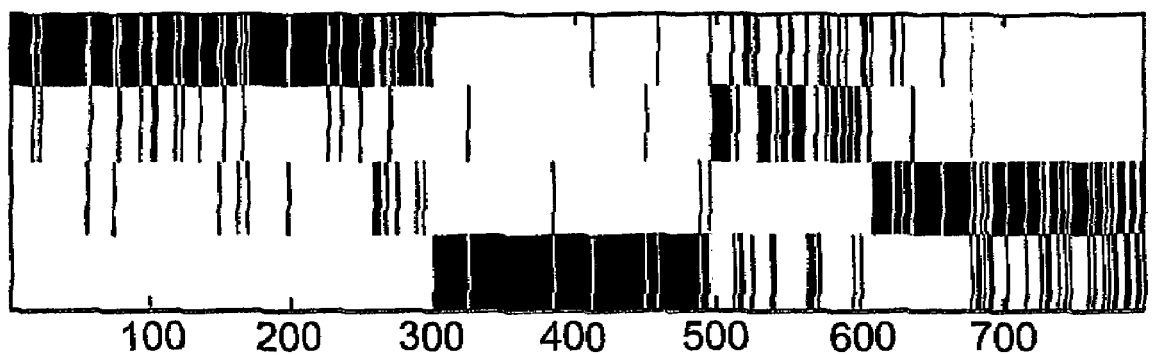
FIG. 23 shows cluster assignments of genes for quantum clustering with σ=0.46 compared with K-means clustering with k=4.
Figure 23:
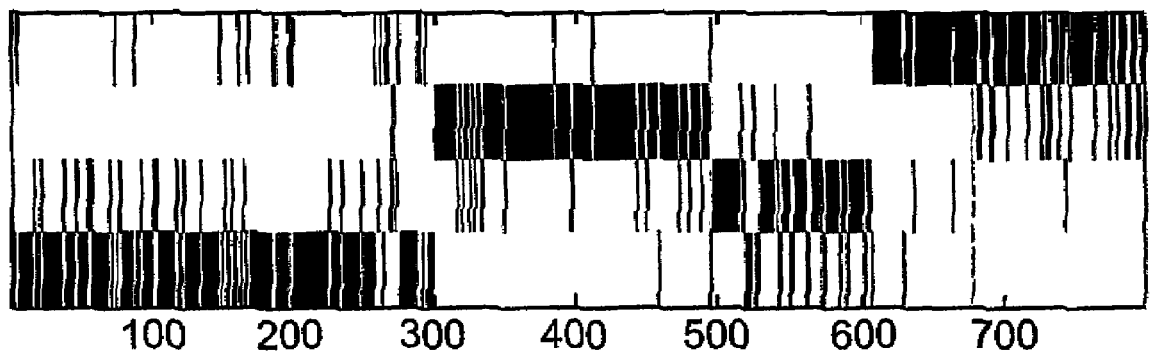

Reference is now made to FIG. 23 showing cluster assignments of genes for quantum clustering with $\sigma=0.46$ compared with k-means clustering with k=4. The cluster assignments are shown by the ordering of genes on the x-axis. There are four cluster assignments of the genes that are presented in an order that preserves their original classification into five groups. The fourth and fifth classes are strongly mixed by both methods. Quantum clustering results are slightly better than the k-means ones. The Jaccard scores are 0.5 for the quantum clustering and 0.46 for the k-means clustering. The k-means method turned out to lead to an even worse Jaccard score for k=5.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of determining clusters of data within a dataset, the dataset is represented by a plurality of multidimensional data entries, the method comprising:
   (a) spanning a space, represented by a plurality of points;
   (b) determining a density function over said space;
   (c) associating a potential to said density function, such that said density function corresponds to an eigenstate of an operator which includes the potential;
   (d) locating a plurality of local minima of said potential by evaluating, using a data processor, said potential in a plurality of evaluation points, thereby providing a plurality of potential values, and selecting minimal values of said potential values; and
   (e) for each of said plurality of local minima, attributing at least one of said points; thereby determining clusters of data within the dataset.

2. The method of claim 1, wherein said spanning of said space is by defining, for each of said plurality of points, a multidimensional coordinate respectfully representing one multidimensional data entry.

3. The method of claim 1, wherein said density function and said potential are each independently positive quantities.

4. The method of claim 1, wherein said determining said density function is by assigning a set of kernels, one for each of said plurality of points and summing over said set of kernels.

5. The method of claim 4, wherein each of said kernels is substantially localized at one of said plurality of points, and characterized by a width, $\sigma$.

6. The method of claim 5, wherein said associating said potential is by constructing a physical analog quantum mechanical model over said space, said model having a Hamiltonian which includes said potential.

7. The method of claim 6, wherein said Hamiltonian equals $-0.5\sigma^2\nabla^2+V(x)$, where said V is said potential and said x is a set of coordinates of said space.

8. The method of claim 6, wherein said density function is a ground state of said Hamiltonian.

9. The method of claim 5, wherein said potential equals $E+(\sigma^2\nabla^2\psi)/2\psi$, wherein said $\psi$ is said density function and said E is calculated in accordance with the formula $E=-\min[(\sigma^2\nabla^2\psi/2\psi]$.

10. The method of claim 5, wherein said width $\sigma$, is selected so that a number of clusters is stable under sufficiently small variation of said $\sigma$.

11. The method of claim 5, further comprising iteratively merging each cluster into a single point, increasing said width and repeating said steps (a) to (e), thereby defining a dendrogram of clusters.

12. The method of claim 5, further comprising:
(f) merging each cluster into a single point;
(g) increasing said width; and
(h) repeating said steps (b) to (e).

13. The method of claim 12, further comprising iteratively repeating said steps (g) to (h), thereby defining a dendrogram of clusters.

14. The method of claim 4, wherein said kernels have equal weights.

15. The method of claim 4, wherein each of said kernels has a predetermined weight.

16. The method of claim 4, wherein said kernels are Gaussians.

17. The method of claim 1, wherein each of said set of kernels represents a Hilbert space state.

18. The method of claim 1, wherein said associating said potential is by constructing a physical analog quantum mechanical model over said space, said model having a Hamiltonian which includes said potential.

19. The method of claim 18, wherein said density function is a ground state of said Hamiltonian.

20. The method of claim 1, wherein said associating said potential is by determining an operator in manner that said density function is an eigenfunction of said operator with an eigenvalue, E, said operator includes said potential.

21. The method of claim 20, wherein said eigenvalue, E, is selected so that a minimal value of said potential is substantially zero.

22. The method of claim 20, wherein said operator further includes at least one additional term.

23. The method of claim 22, wherein said at least one additional term includes a kinetic term.

24. The method of claim 23, wherein said kinetic term comprises a Laplacian.

25. The method of claim 1, wherein each of said evaluation points respectively corresponds to one data entry.

26. The method of claim 1, wherein said attributing at least one of said points is by visual means.

27. The method of claim 1, wherein said attributing at least one of said points is by a dynamically descending said at least one points of said space in a direction of a gradient of said potential, into said plurality of local minima.

28. The method of claim 1, wherein said spanning a space is by eliminating at least one dimension from the dataset.

29. The method of claim 28, wherein said eliminating is by constructing a correlation matrix from the dataset, calculating a set of eigenvalues of said correlation matrix, and selecting a subset of said set of eigenvalues.

30. The method of claim 29, wherein said subset includes largest eigenvalues of said set of eigenvalues.

31. The method of claim 29, wherein said correlation matrix is an autocorrelation matrix.

32. The method of claim 29, wherein said correlation matrix is a covariance matrix.

33. The method of claim 29, further comprising diagonalizing and normalizing said correlation matrix to a unitary diagonal correlation matrix.

34. The method of claim 1, wherein the dataset has a matrix form, hence the dataset is a dataset-matrix, M.

35. The method of claim 34, wherein said spanning a space is by truncating said dataset-matrix, so as to construct a truncated space having a reduced dimensionality.

36. The method of claim 35, wherein said truncating is by constructing a transformation matrix from said dataset-matrix, calculating a set of eigenvalues of said transformation matrix, and selecting a subset of said set of eigenvalues, thereby constructing said truncated space.

37. The method of claim 36, wherein said subset includes largest eigenvalues of said set of eigenvalues.

38. The method of claim 36, wherein said constructing said transformation matrix is by multiplying said dataset-matrix by a first matrix from the left and by a second matrix from the fight, each of said first and second matrices being respectively formed from an orthonormal set of vectors.

39. The method of claim 38, further comprising projecting each point in said truncated space onto a unit sphere in said truncated space.

40. The method of claim 36, wherein said first matrix diagonalizes $MM^T$ and said second matrix diagonalizes $M^TM$, where $M^T$ is a transpose representation of said dataset-matrix, M.

41. A method of determining clusters of biological data within a dataset, the dataset is represented by a multidimensional dataset-matrix, M, the method comprising:
truncating the dataset-matrix, M, so as to construct a truncated space having a reduced dimensionality, said truncated space is represented by a plurality of points, each representing one biological entry; and
using a data processor for partitioning said plurality of points, into a plurality of clusters;
thereby determining clusters of determining clusters of biological data within the dataset.

42. The method of claim 41, wherein each biological entry is characterized by a plurality of expressed genes, expressed proteins, antibodies, physiological parameters, biochemical parameters.

43. The method of claim 41, wherein each biological entry is selected from the group consisting of a sample, a cell and a tissue.

44. The method of claim 41, wherein each biological entry corresponds to one subject at one time.

45. The method of claim 41, wherein said truncating is by constructing a transformation matrix from the dataset-matrix, calculating a set of eigenvalues of said transformation matrix, and selecting a subset of said set of eigenvalues, thereby constructing said truncated space.

46. The method of claim 45, wherein said subset includes largest eigenvalues of said set of eigenvalues.

47. The method of claim 45, wherein said constructing said transformation matrix is by multiplying the dataset-matrix by a first matrix from the left and by a second matrix from the right, each of said first and second matrices being respectively formed from an orthonormal set of vectors.

48. The method of claim 47, further comprising projection each point in said truncated space onto a unit sphere in said truncated space.

49. The method of claim 45, wherein said first matrix diagonalizes $MM^T$ and said second matrix diagonalizes $M^TM$, where $M^T$ is a transpose representation of said dataset-matrix, M.

50. The method of claim 41, wherein said partitioning comprising:
(a) determining a density function over said truncated space;
(b) associating a potential to said density function;
(c) locating a plurality of local minima of said potential; and
(d) for each of said plurality of local minima, attributing at least one of said points;

thereby partitioning said plurality of points, into a plurality of clusters.

51. A method of determining clusters of data within a dataset, the dataset is represented by a plurality of multidimensional data entries, the method comprising:

(a) spanning a space, represented by a plurality of points;
(b) determining a density function over said space by assigning a set of kernels, one for each of said plurality of points and summing over said set of kernels;
(c) associating a potential to said density function;
(d) using a data processor for locating a plurality of local minima of said potential;
and
(e) for each of said plurality of local minima, attributing at least one of said points;

thereby determining clusters of data within the dataset.

52. A method of determining clusters of data within a dataset, the dataset is represented by a plurality of multidimensional data entries, the method comprising:

(a) spanning a space, represented by a plurality of points;
(b) determining a density function over said space;
(c) associating a potential to said density function by determining an operator in manner that said density function is an eigenfunction of said operator with an eigenvalue, E, said operator includes said potential;
(d) using a data processor for locating a plurality of local minima of said potential; and
(e) for each of said plurality of local minima, attributing at least one of said points;

thereby determining clusters of data within the dataset.

53. A method of determining clusters of data within a dataset, the dataset is represented by a plurality of multidimensional data entries, the method comprising:

(a) spanning a space, represented by a plurality of points, by eliminating at least one dimension from the dataset;
(b) determining a density function over said space;
(c) associating a potential to said density function;
(d) using a data processor for locating a plurality of local minima of said potential; and
(e) for each of said plurality of local minima, attributing at least one of said points;

thereby determining clusters of data within the dataset.

* * * * *